United States Patent
Xiu et al.

(10) Patent No.: US 11,134,259 B2
(45) Date of Patent: Sep. 28, 2021

(54) SYSTEM AND METHOD FOR ENHANCED MOTION COMPENSATION USING ADAPTIVE FILTERING

(71) Applicant: INTERDIGITAL MADISON PATENT HOLDINGS, SAS, Paris (FR)

(72) Inventors: Xiaoyu Xiu, San Diego, CA (US); Yuwen He, San Diego, CA (US); Yan Ye, San Diego, CA (US)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 74 days.

(21) Appl. No.: 15/781,994

(22) PCT Filed: Jan. 9, 2017

(86) PCT No.: PCT/US2017/012674
§ 371 (c)(1),
(2) Date: Jun. 6, 2018

(87) PCT Pub. No.: WO2017/123487
PCT Pub. Date: Jul. 20, 2017

(65) Prior Publication Data
US 2018/0359480 A1    Dec. 13, 2018

Related U.S. Application Data

(60) Provisional application No. 62/279,473, filed on Jan. 15, 2016.

(51) Int. Cl.
*H04N 19/51* (2014.01)
*H04N 19/117* (2014.01)
(Continued)

(52) U.S. Cl.
CPC ......... *H04N 19/51* (2014.11); *H04N 19/117* (2014.11); *H04N 19/124* (2014.11);
(Continued)

(58) Field of Classification Search
CPC . G06T 2207/20016; G06T 5/002; G06T 5/50; G06T 2207/10024; G06T 5/20;
(Continued)

(56) References Cited

U.S. PATENT DOCUMENTS

| | | | |
|---|---|---|---|
| 7,596,308 B2 * | 9/2009 | Nakai | G03B 13/34 348/353 |
| 7,710,502 B2 * | 5/2010 | Chan | H04N 9/78 348/668 |

(Continued)

FOREIGN PATENT DOCUMENTS

| | | |
|---|---|---|
| WO | 2005117447 | 12/2005 |
| WO | 2015048176 | 4/2015 |

OTHER PUBLICATIONS

Dong J et al: "Non-RCE1: In-loop Chroma Enhancement for HEVC Range Extensions", 14. JCT-VC Meeting; Jul. 25, 2013-Aug. 2, 2013; Vienna; (Joint Collaborative Team on Video Coding of ISO/IEC JTC1/SC29/WG11 and ITU-T SG.16); URL: http://wftp3.itu.int./av-arch/jctv-site/,,No. JCTVC-N0223-v2, Jul. 25, 2013 (Jul. 25, 2013), XP030114731, the whole document, 5 pp.

(Continued)

*Primary Examiner* — Nguyen T Truong
(74) *Attorney, Agent, or Firm* — Invention Mine LLC

(57) ABSTRACT

Video coding systems and methods are described using an enhanced motion compensated picture. In exemplary embodiments, an enhanced motion compensated picture is generated by applying at least one high-pass filter to the motion compensated picture and adding the output of the filter to the motion compensated picture. Coefficients of the (Continued)

high-pass filter are selected by comparing the enhanced motion compensated picture to an original picture. The selected coefficients may be quantized and entropy coded into a bit stream. The high-pass filter may be a cross-plane filter, in which a luma component, which may be an enhanced luma component, is high-pass filtered and the output of the filter is added to at least one of the chroma components to generate an enhanced chroma component.

14 Claims, 20 Drawing Sheets

(51) Int. Cl.
    *H04N 19/82* (2014.01)
    *H04N 19/70* (2014.01)
    *H04N 19/86* (2014.01)
    *H04N 19/85* (2014.01)
    *H04N 19/186* (2014.01)
    *H04N 19/124* (2014.01)
    *H04N 19/44* (2014.01)

(52) U.S. Cl.
    CPC ........... *H04N 19/186* (2014.11); *H04N 19/45* (2014.11); *H04N 19/70* (2014.11); *H04N 19/82* (2014.11); *H04N 19/85* (2014.11); *H04N 19/86* (2014.11)

(58) Field of Classification Search
    CPC . G06T 2207/20048; G06T 2207/20182; G06T 2207/20208; G06T 2207/20221; G06T 5/009; G06T 2207/10016; G06T 2207/10144; H04N 5/217; H04N 9/646; H04N 5/208; H04N 5/23232; H04N 9/77; H04N 9/67; H04N 9/69; H04N 9/73; H04N 19/117; H04N 19/82; H04N 19/176; H04N 19/61; H04N 19/70; H04N 19/124; H04N 19/147; H04N 19/80; H04N 19/105; H04N 19/172; H04N 19/86; H04N 19/136; H04N 19/91; H04N 19/174; H04N 9/78; H04N 19/186; H04N 19/30; H04N 19/46; H04N 2005/91314; H04N 2005/91321; H04N 2005/91328; H04N 2005/91335
    See application file for complete search history.

(56) References Cited

U.S. PATENT DOCUMENTS

| | | | | |
|---|---|---|---|---|
| 7,733,411 B2* | 6/2010 | Yanada | ............... | H04N 5/23212 348/222.1 |
| 8,731,054 B2* | 5/2014 | Walker | ................. | H04N 19/105 375/240.12 |
| 9,571,861 B2* | 2/2017 | Siekmann | ............ | H04N 19/176 |
| 9,912,942 B2* | 3/2018 | Pu | ........................... | H04N 19/82 |
| 10,397,616 B2* | 8/2019 | Dong | ..................... | H04N 19/70 |
| 10,452,743 B2* | 10/2019 | Dong | ..................... | H04N 19/61 |
| 2005/0281334 A1* | 12/2005 | Walker | ................. | H04N 19/105 375/240.16 |
| 2007/0081173 A1* | 4/2007 | Yanada | ............... | H04N 5/23212 358/1.6 |
| 2007/0217509 A1* | 9/2007 | Chan | ...................... | H04N 5/144 375/240.12 |
| 2011/0026599 A1 | 2/2011 | Andersson | | |
| 2011/0279730 A1* | 11/2011 | Goshi | ...................... | G06T 5/10 348/627 |
| 2012/0039383 A1* | 2/2012 | Huang | ................. | H04N 19/176 375/240.02 |
| 2013/0034159 A1* | 2/2013 | Siekmann | ............ | H04N 19/176 375/240.12 |
| 2013/0083851 A1* | 4/2013 | Alshin | ................. | H04N 19/577 375/240.14 |
| 2014/0092999 A1* | 4/2014 | Dong | ..................... | H04N 19/70 375/240.29 |
| 2014/0140399 A1* | 5/2014 | Seregin | ................ | H04N 19/187 375/240.12 |
| 2014/0185665 A1* | 7/2014 | Pu | ........................ | H04N 19/117 375/240.02 |
| 2015/0016512 A1* | 1/2015 | Pu | ........................ | H04N 19/147 375/240.03 |
| 2015/0365677 A1* | 12/2015 | Nakagawa | ........... | H04N 19/105 375/240.02 |
| 2016/0127735 A1* | 5/2016 | Nakagawa | ........... | H04N 19/105 375/240.16 |
| 2017/0099490 A1* | 4/2017 | Seregin | ................ | H04N 19/176 |
| 2018/0124400 A1 | 5/2018 | He | | |

OTHER PUBLICATIONS

Dong J et al: "SEI message: post filters to enhance the chroma planes", 14. JCT-VC Meeting; Jul. 25, 2013-Aug. 2, 2013; Vienna; (Joint Collaborative Team on Video Coding of ISO/IEC JTC1/SC29/WG11 and ITU-T SG.16); URL: http://wftp3.itu.int./av-arch/jctv-site/,,No. JCTVC-N0224-v3, Aug. 1, 2013 (Aug. 1, 2013), XP030114733, the whole document, 9 pp.

Dong J et al: "Chroma Enhancement for ILR picture", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL: http://wftp3.itu.int./av-arch/jctv-site/,,No. JCTVC-L0059, Jan. 8, 2013 (Jan. 8, 2013), XP030113547, 6 pp.

Dong Jie et al: "Cross-plane chroma enhancement for SHVC Inter-Layer Prediction", 2013 Picture Coding Symposium (PCS), IEEE, Dec. 8, 2013 (Dec. 8, 2013, pp. 309-312, XP032566974, DOI: 10.1109/PCS.2013.6737745 [retrieved on Feb. 11, 2014], the whole document, 4 pp.

Xiu Xiaoyu et al: "Adaptive enhancement filtering for motion compensation", 2016 IEEE 18th International Workshop on Multimedia Signal Processing (MMSP), IEEE, Sep. 21, 2016 (Sep. 21, 2016), pp. 1-6, XP033041412, DOI: 10.1109/MMSP.2016.7813402 [retrieved on Jan. 10, 2017] the whole document, 6 pp.

Notification of transmittal of the International Search Report and the Written Opinion of the International Searching Authority, or Declaration for PCT/US2017/012674 dated Apr. 12, 2017, 17 pp.

Written Opinion of the International Preliminary Examining Authority for PCT/US2017/012674 dated Dec. 13, 2017.

International Preliminary Report on Patentability for PCT/US2017/012674, dated Apr. 9, 2018.

International Telecommunication Union, "Advanced Video Coding for Generic Audiovisual Services". In Series H: Audiovisual and Multimedia Systems; Infrastructure of audiovisual services; Coding of moving video. ITU-T Rec H.264 (Nov. 2007), 564 pages, Nov. 2007.

SMPTE 421M, "VC-1 Compressed Video Bitstream Format and Decoding Process". SMPTE Standard, Apr. 2006, 493 pages.

Bross, B., et. al., "High Efficiency Video Coding (HEVC) text specification draft 10 (for FDIS and Last Call)". Joint Collaborative Team on Video Coding (JCT-VC), Document No. JCTVC-L1003. Jan. 2013, 315 pages.

Wiegand, T., et. al, "WD3: Working Draft 3 of High Efficiency Video Coding". Joint Collaborative Team on Video Coding, JCTVC-E603, Mar. 2011, 160 pages.

Yoo, Young-Joe, et. al., "Enhanced Adaptive Loop Filter for Motion Compensated Frame". IEEE Transactions on Image Processing, vol. 20, No. 8, Aug. 2011, pp. 2177-2188.

* cited by examiner

SYSTEM AND METHOD FOR ENHANCED MOTION COMPENSATION USING ADAPTIVE FILTERING

CROSS-REFERENCE TO RELATED APPLICATION

The present application is a national stage application under 35 U.S.C. 371 of International Application No. PCT/US2017/012674, entitled SYSTEM AND METHOD FOR ENHANCED MOTION COMPENSATION USING ADAPTIVE FILTERING, filed Jan. 9, 2017, which claims benefit under 35 U.S.C. § 119(e) from, U.S. Provisional Patent Application Ser. No. 62/279,473, entitled "System and Method for Enhanced Motion Compensation Using Adaptive Filtering", filed Jan. 15, 2016, the entirety of which is incorporated herein by reference.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG1/2/4 part 2, H.264/MPEG-4 part 10 AVC [1][3],VC-1 [2], and the latest video coding standard called High Efficiency Video Coding (HEVC) [4], which was developed by JCT-VC (Joint Collaborative Team on Video Coding) of ITU-T/SG16/Q.6/VCEG and ISO/IEC/MPEG.

SUMMARY

In this disclosure, methods are described for improving the efficiency of motion compensated prediction and therefore enhance the quality of temporal prediction. Exemplary methods operate to apply adaptive filtering at the motion compensation stage.

In some embodiments, a high-pass filter for the motion compensated signal of the luma component is used in order to restore the missing/distorted high-frequency information incurred by noise and quantization errors for temporal prediction. In some embodiments, the filter coefficients are optimized in a way that the total energy of luma residual signal is minimized; therefore reducing the overhead of signaling luma residuals.

In some embodiments, cross-plane filters are used at the motion compensation stage to use the high-frequency information of the luma component in the motion compensated picture as guidance to improve the quality of motion compensated chroma samples. This way, the chroma residual signal energy is reduced, thus improving the overall coding efficiency.

Different adaptation methods are described to improve the coding gain that is achievable by the proposed adaptive filtering method for motion compensated signals.

In an exemplary method of coding a video signal, a motion-compensated signal is generated, where the motion-compensated signal includes at least a motion-compensated luma component and at least a first motion-compensated chroma component. A first high-pass filter is applied to the motion-compensated luma component to generate a first filtered output. The motion-compensated signal is then modified by adding the first filtered output to the first motion-compensated chroma component. The video signal is then predicted using the modified motion-compensated signal. In some embodiments, a second high-pass filter is applied to the motion-compensated luma component to generate a second filtered output, and the motion-compensated signal is further modified by adding the second filtered output to a second motion-compensated chroma component.

Such a method may further include applying a second high-pass filter to the motion-compensated luma component to generate a second filtered output and further modifying the motion-compensated signal by adding the second filtered output to the motion-compensated luma component.

In a further embodiment, prior to applying the first high-pass filter to the motion-compensated luma component, the motion-compensated luma component by a method comprising: (a) applying a second high-pass filter to the motion-compensated luma component to generate a second filtered output; and (b) modifying the luma component by adding the second filtered output to the motion-compensated luma component, where the first high-pass filter is applied to modified luma component to generate the first filtered output.

In some embodiments, generating the motion-compensated signal comprises generating the motion-compensated signal through bi-prediction by averaging a first motion-compensated signal from a first reference picture and a second reference picture from a second reference picture.

Various techniques for filter training are described. In some embodiments, filter coefficients of the first high-pass filter using linear minimum mean square error estimation, which may include comparing an original picture signal with the modified motion-compensated picture signal. Filter coefficients may be selected subject to various constraints, such as a zero summation constraint and/or a symmetry constraint.

In some embodiments, the first high-pass filter is defined by a set of filter coefficients, and an encoder operates to encode the filter coefficients in a bitstream. An encoder may further encode a prediction residual in the bitstream.

In some embodiments, a decoder extracts filter coefficients from a bitstream, wherein the first high-pass filter is a filter defined by the extracted filter coefficients. The decoder may further extract a prediction residual from the bitstream and reconstruct the video signal using the predicted video signal and the extracted residual. In some embodiments, filter coefficients may be derived at the decoder side. For example, a decoder may derive filter coefficients based on previously-reconstructed samples (e.g. neighboring samples).

In some embodiments using bi-prediction, different filters may be applied to signals from different reference pictures. One such embodiment comprises: (a) generating a first motion-compensated signal using a first reference picture and a second motion-compensated signal using a second reference picture, the first and second motion-compensated signals each having a luma component and at least one chroma component; (b) applying a first high-pass filter to the motion-compensated luma component of the first motion-compensated signal to generate a first filtered output; (c) applying a second high-pass filter to the motion-compensated luma component of the second motion-compensated signal to generate a second filtered output; (d) modifying the first motion-compensated signal by adding the first filtered output to the chroma component thereof; (e) modifying the second motion-compensated signal by adding the second filtered output to the chroma component thereof; and (f)

predicting the video signal using an average of the first and second modified motion-compensated signals.

Video encoder and decoder hardware for performing the functions described herein are further disclosed.

BRIEF DESCRIPTION OF THE DRAWINGS

FIG. 4A represents 4:4:4 chroma format; FIG. 4B represents 4:2:2 chroma format; and FIG. 4C represents 4:2:0 chroma format.

DETAILED DESCRIPTION

Block-Based Video Coding.

Figure 1:
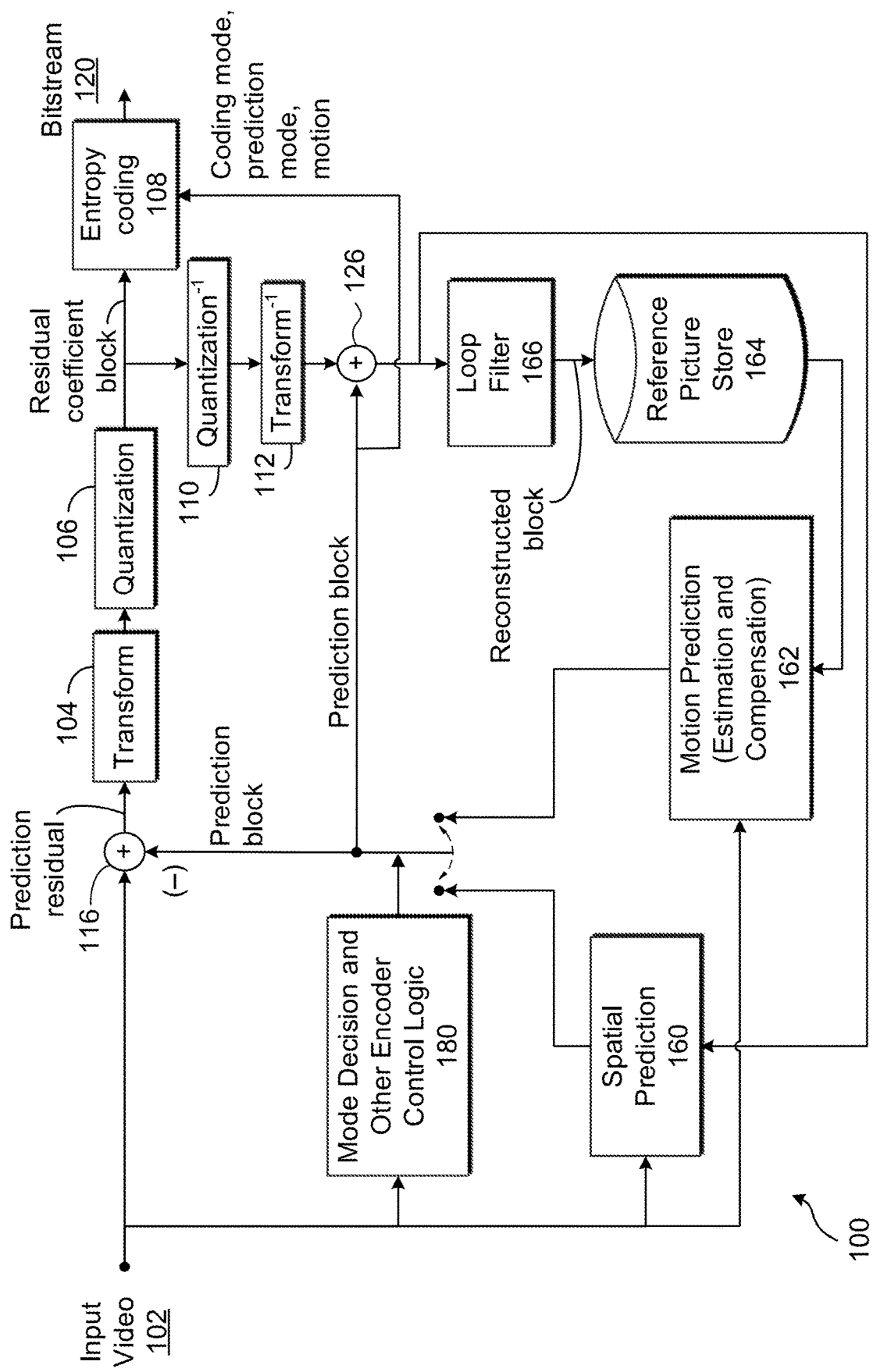
FIG. 1 is a functional block diagram of a block-based video encoder.

FIG. 1 is a block diagram of a generic block-based hybrid video encoding system. The input video signal 102 is processed block by block. In HEVC, extended block sizes (called a "coding unit" or CU) are used to efficiently compress high resolution (1080p and beyond) video signals. In HEVC, a CU can be up to 64×64 pixels. A CU can be further partitioned into prediction units or PU, for which separate prediction methods are applied. For each input video block (MB or CU), spatial prediction (160) and/or temporal prediction (162) may be performed. Spatial prediction (or "intra prediction") uses pixels from the already-coded neighboring blocks in the same video picture/slice to predict the current video block. Spatial prediction reduces spatial redundancy inherent in the video signal. Temporal prediction (also referred to as "inter prediction" or "motion compensated prediction") uses pixels from the already coded video pictures to predict the current video block. Temporal prediction reduces temporal redundancy inherent in the video signal. Temporal prediction signal for a given video block is usually signaled by one or more motion vectors which indicate the amount and the direction of motion between the current block and its reference block. Also, if multiple reference pictures are supported (as is the case for the recent video coding standards such as H.264/AVC or HEVC), then for each video block, its reference picture index is sent additionally; and the reference index is used to identify from which reference picture in the reference picture store (164) the temporal prediction signal comes. After spatial and/or temporal prediction, the mode decision block (180) in the encoder chooses the best prediction mode, for example based on the rate-distortion optimization method. The prediction block is then subtracted from the current video block (116); and the prediction residual is de-correlated using transform (104) and quantized (106) to achieve the target bit-rate. The quantized residual coefficients are inverse quantized (110) and inverse transformed (112) to form the reconstructed residual, which is then added back to the prediction block (126) to form the reconstructed video block. Further in-loop filtering such as de-blocking filter and Adaptive Loop Filters may be applied (166) on the reconstructed video block before it is put in the reference picture store (164) and used to code future video blocks. To form the output video bit-stream 120, coding mode (inter or intra), prediction mode information, motion information, and quantized residual coefficients are all sent to the entropy coding unit (108) to be further compressed and packed to form the bit-stream.

Figure 2:
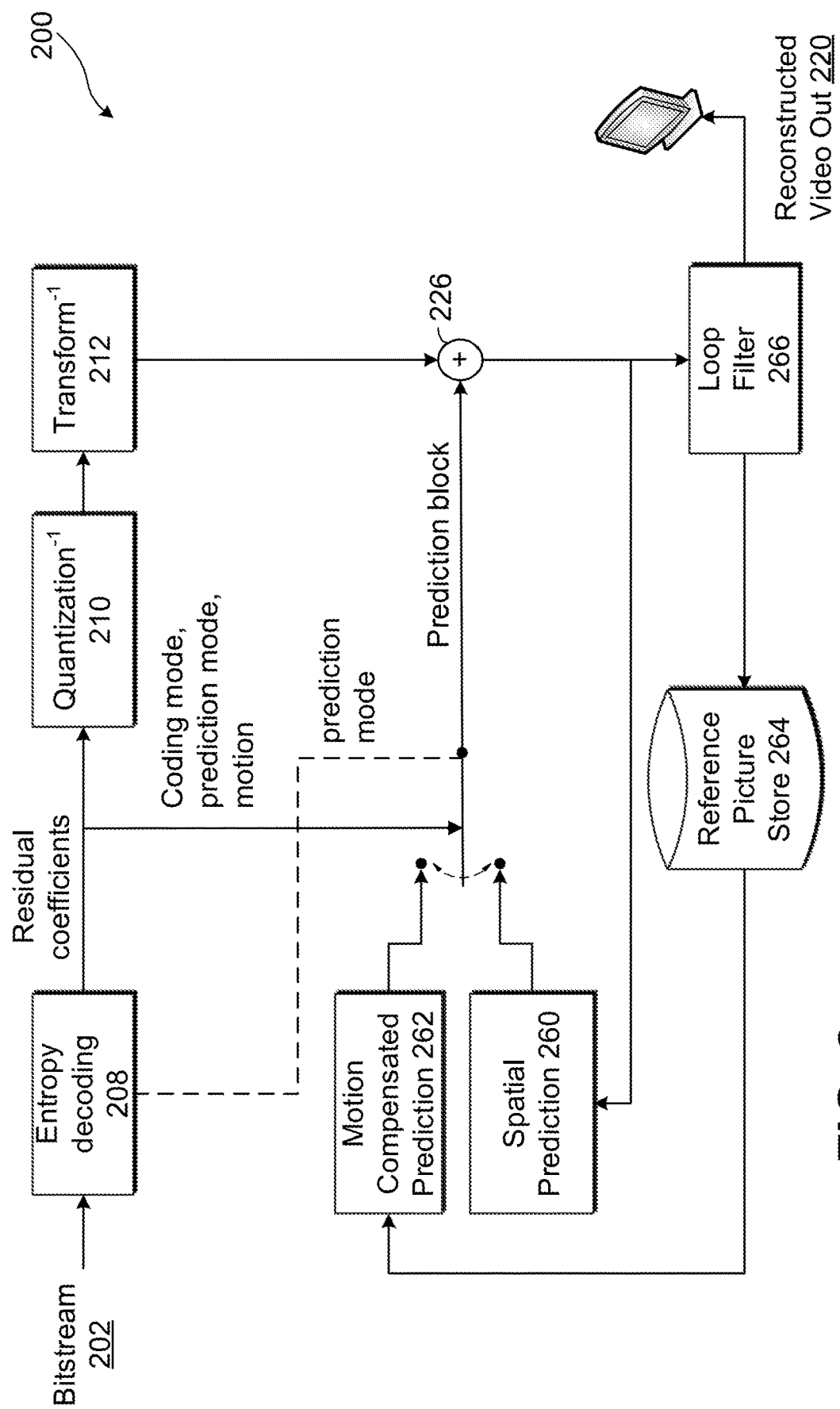
FIG. 2 is a functional block diagram of a video decoder.

FIG. 2 is a general block diagram of a block-based video decoder. The video bit-stream 202 is first unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering before it is stored in reference picture store 264. The reconstructed video in reference picture store is then sent out to drive a display device, as well as used to predict future video blocks.

Adaptive Loop Filtering.

It is known that coding artifacts, such as block artifacts, ringing artifacts, color distortion and blurring, commonly exist in prior video coding standards (especially at medium and low bit-rate). In order to reduce those artifacts and improve fidelity to the input signal, Wiener filters can be applied to the reconstruct samples such that the quality of the filtered samples in the reconstructed pictures are enhanced. As the enhanced reconstruction provides reference pictures in higher quality for subsequent pictures, the efficiency of inter prediction can be also improved. During the development of HEVC, adaptive loop filtering (ALF) based on the Wiener filter was once used in in-loop filtering process (as shown in FIG. 1 and FIG. 2) [5]. In [5], block-based ALF design is applied where blocks in various sizes are determined to be filtered or not, and the corresponding information is indicated in the bit-stream using a quad-tree based structure.

Figure 3A:
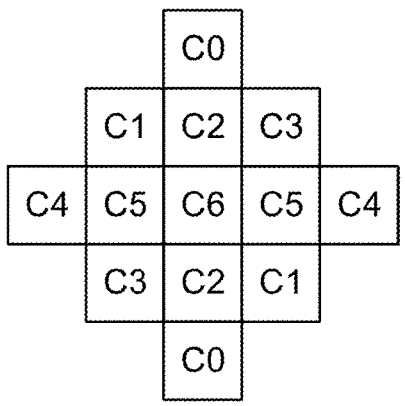
FIGS. 3A-3C illustrate three adaptive loop filter (ALF) filter shapes: 5×5 diamond (FIG. 3A), 7×7 diamond (FIG. 3B), 9×9 diamond (FIG. 3C).
Figure 3B:
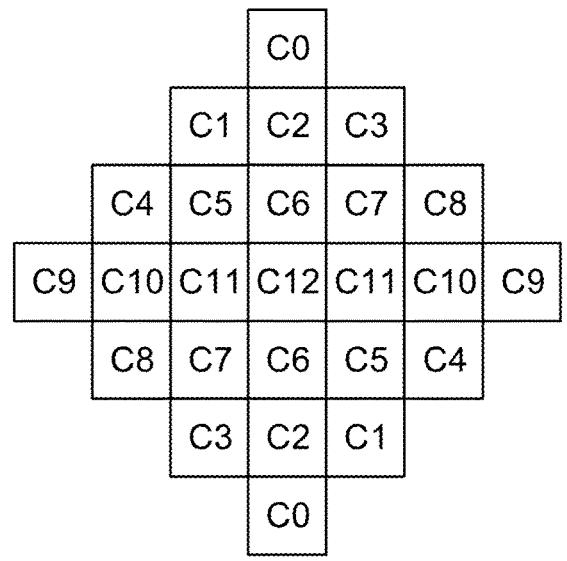
Figure 3C:
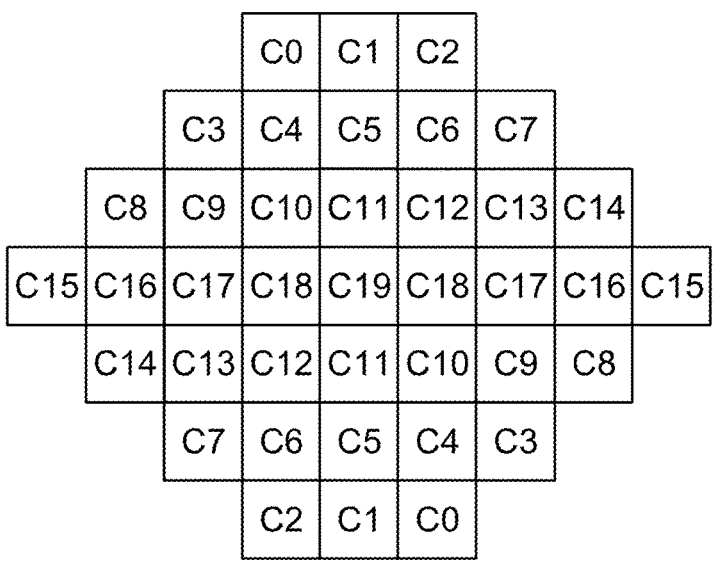

For example, for the luma component, 4×4 blocks in one picture are firstly classified based on 1D Laplacian direction (up to 3 directions) and 2D Laplacian activity (up to 5 activity values). The direction $Dir_b$ and activity $Act_b$ are calculated as follows:

$$V_{i,j} = |\hat{I}_{i,j} \times 2 - \hat{I}_{i,j-1} - \hat{I}_{i,j+1}| \quad (1)$$
$$H_{i,j} = |\hat{I}_{i,j} \times 2 - \hat{I}_{i-1,j} - \hat{I}_{i+1,j}|$$

$$Dir_b = \begin{cases} 1, & \text{if } \left(\sum_{i=0}^{3}\sum_{j=0}^{3} H_{i,j} > 2 \times \sum_{i=0}^{3}\sum_{j=0}^{3} V_{i,j}\right) \\ 2, & \text{if } \left(\sum_{i=0}^{3}\sum_{j=0}^{3} V_{i,j} > 2 \times \sum_{i=0}^{3}\sum_{j=0}^{3} H_{i,j}\right) \\ 0, & \text{otherwise} \end{cases} \quad (2)$$

$$Act_b = \sum_{i=0}^{3}\sum_{j=0}^{3}\left(\sum_{m=i-1}^{i+1}\sum_{n=j-1}^{j+1}(V_{m,n} + H_{m,n})\right) \quad (3)$$

where $\hat{I}_{i,j}$ indicates a reconstructed sample with relative coordinate (i,j) to the top-left of a 4×4 block. $Act_b$ is further quantized to the range of 0 to 4 inclusively. In total, each 4×4 block is categorized into one out of 15 (5×3) groups and an index is assigned to the block according the value of $Dir_b$ and $Act_b$. Therefore, up to 15 sets of ALF parameters are signaled for the luma component. To save the signaling cost, neighboring sets of ALF parameters can be merged into one single set. For each set (or merged set), a number of ALF coefficients are signaled. In total, up to three circular symmetric filter shapes as shown in FIGS. 3A-3C are supported in [5]. Additionally, in order to maximize the coding gain achieved by ALF, a flag is signaled at the CU level to indicate whether ALF is applied to the CU [5]. For chroma components, a single set of ALF parameters is signaled and the 5×5 diamond filter in FIG. 3A is always applied.

At the decoder side, if a sample $\hat{I}_{i,j}$ is to be filtered, the corresponding reconstructed value $I'_{i,j}$ after ALF is calculated by 2-D convolution process as indicated as $$I'_{i,j} = \sum_{m=-L}^{L}\sum_{n=-L}^{L} f_{m,n} \times \hat{I}_{i+m,j+n} + o \quad (4)$$

where L denotes filter length, $f_{m,n}$ represents filter coefficient and o indicates filter offset. Note that the filter group to which $\hat{I}_{i,j}$ belongs is determined first, and the corresponding filter parameters for that filter group are used to perform the calculation in (4).

Cross-Component Filtering.

Since the human vision system is much more sensitive to variations in brightness than color, a video coding system usually devotes more bandwidth to the luma component (e.g., Y component in YCbCr format) than to the chroma components (e.g., Cb and Cr components in YCbCr format). For example, the chroma components may be subsampled to reduce spatial resolution without serious degradation of the perceived quality for the reconstructed video. In practice, 4:4:4, 4:2:2 and 4:2:0 are three chroma subsampling formats that are commonly used in practical video coding systems. In the 4:2:0 chroma format, the sampling rates of the chroma components in both horizontal and vertical directions are reduced to half of that of the luma component. In 4:2:2 chroma format, the horizontal sampling rate of the chroma components is reduced to half while the vertical sampling rate remains the same as that of the luma component. For video applications that requires high fidelity, 4:4:4 chroma format is used where the chroma components have exactly the same sampling rates in both horizontal and vertical directions as that of the luma component.

Due to the subsampling process, the values of chroma components usually have smaller dynamic range than that of the luma component. Therefore, the transform coefficients of chroma components are more likely to be quantized to zero, resulting in blurred edges and textures in chroma planes. This could further reduce the prediction efficiency of neighboring blocks in the same picture and blocks in the subsequent pictures, given that the reconstructed chroma samples will be used as references in both intra prediction and inter prediction.

Figure 4A:
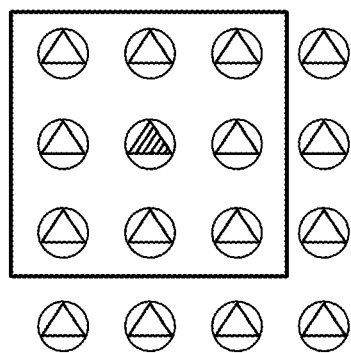
FIGS. 4A-C illustrate examples of cross-component filtering, where circles and triangles represent luma and chroma samples, respectively, and a rectangle encloses the supporting luma samples that are used to enhance the target chroma sample (represented by hatched triangles).
Figure 4B:
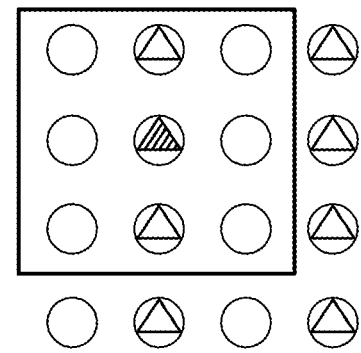
Figure 4C:
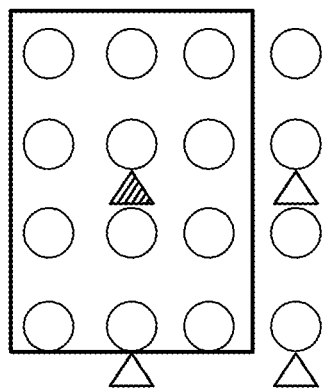

In order to restore the blurred edges and textures (high-frequency information) in chroma components, in [6], a cross-plane filtering method has been proposed to use high-frequency information of the luma component to improve the quality of the chroma components. Specifically, a picture-based and region-based cross-component chroma enhancement method is used, where the quality of reconstructed chroma components is enhanced through extracting high-frequency information from the luma component. Specifically, for a given chroma sample position, a high-pass filter may be applied to its neighboring luma samples to calculate the high frequency information in the form of an offset; the calculated offset is then added to the chroma sample at the given position. This is written as $$o(x, y) = \sum_{i=-H}^{H}\sum_{j=-L}^{L} f_c(i, j) \times Y(s_x \times x - i, s_y \times y - j) \quad (5)$$

$$\hat{C}(x, y) = C(x, y) + o(x, y)$$

where $C(x,y)$ and $\hat{C}(x,y)$ represent the reconstructed chroma sample at the coordinate (x,y) before and after cross-plane filtering; $f_C(i,j)$ indicates the coefficients of the high-pass filter that is applied to the corresponding H×L luma neighboring samples $Y(s_x \times x-i, s_y \times y-j)$; $s_x$ and $s_y$ are the resolution ratio in x and y directions between luma and chroma components (Table 1 shows the values of $s_x$ and $s_y$ for various chroma formats); $o(x,y)$ is the calculated offset applied to the chroma component. FIGS. 4A-4C show examples of cross-component filtering where bold lines enclose the neighboring luma samples that are used to generate the offset for enhancing the target chroma samples (as indicated by hatched triangles), for 4:4:4, 4:2:2 and 4:2:0 chroma formats.

TABLE 1

$s_x$ and $s_y$ definitions

| Chroma format | $s_x$ | $s_y$ |
|---|---|---|
| 4:4:4 | 1 | 1 |
| 4:2:2 | 2 | 1 |
| 4:2:0 | 2 | 2 |

Temporal Reference Picture Quality.

Motion compensated prediction (MCP) enhances the efficiency of inter prediction for existing video coding standards. With motion compensated prediction, the video signal to be coded is predicted from a temporally neighboring signal and only the prediction error, motion vector(s) (MV), and reference index(es) are transmitted. As discussed above, ALF and cross-plane filtering can effectively increase the quality of reconstructed video, thus improving the performance of inter coding by providing high-quality reference pictures. However, the quality of temporal reference pictures still may not be good enough to provide efficient inter prediction for the following reasons.

First, the video signal may be coded with coarse quantization using high quantization parameter (QP) values. When coarse quantization is applied, the reconstructed picture may contain severe coding artifacts such as blocking artifacts, ringing artifacts, etc. This may cause certain high-frequency information that is present in the original picture to be missing and/or distorted in the reconstructed picture, e.g., in the form of distorted edges and blurred textures. Given that the reconstructed signal of the current picture will be used as a reference for temporal prediction, such missing and/or distorted high-frequency information could reduce the effectiveness of motion compensated prediction and therefore inter coding efficiency for subsequent pictures.

Second, since the human vision system is much more sensitive to variations in brightness than color, a video coding system usually devotes more bits to the luma component than chroma components, e.g., by adjusting the QP delta value between luma component and chroma components. Additionally, chroma components usually have smaller dynamic range, therefore are smoother than the luma component. Consequently, more transform coefficients of chroma components become zero after quantization. Therefore, the problem of missing or distorted high-frequency information can be much more pronounced in the reconstructed chroma signal. This could seriously affect the prediction efficiency of chroma components as more bits need to be generated to code chroma residue signal. Although ALF may be applied to reduce the distortion between the reference chroma signal and the original chroma signal, it cannot recover the high-frequency information that is missing in the reference chroma samples, given the low-pass characteristics of ALF filters.

Video Encoder in an Exemplary Embodiment.

Figure 5:
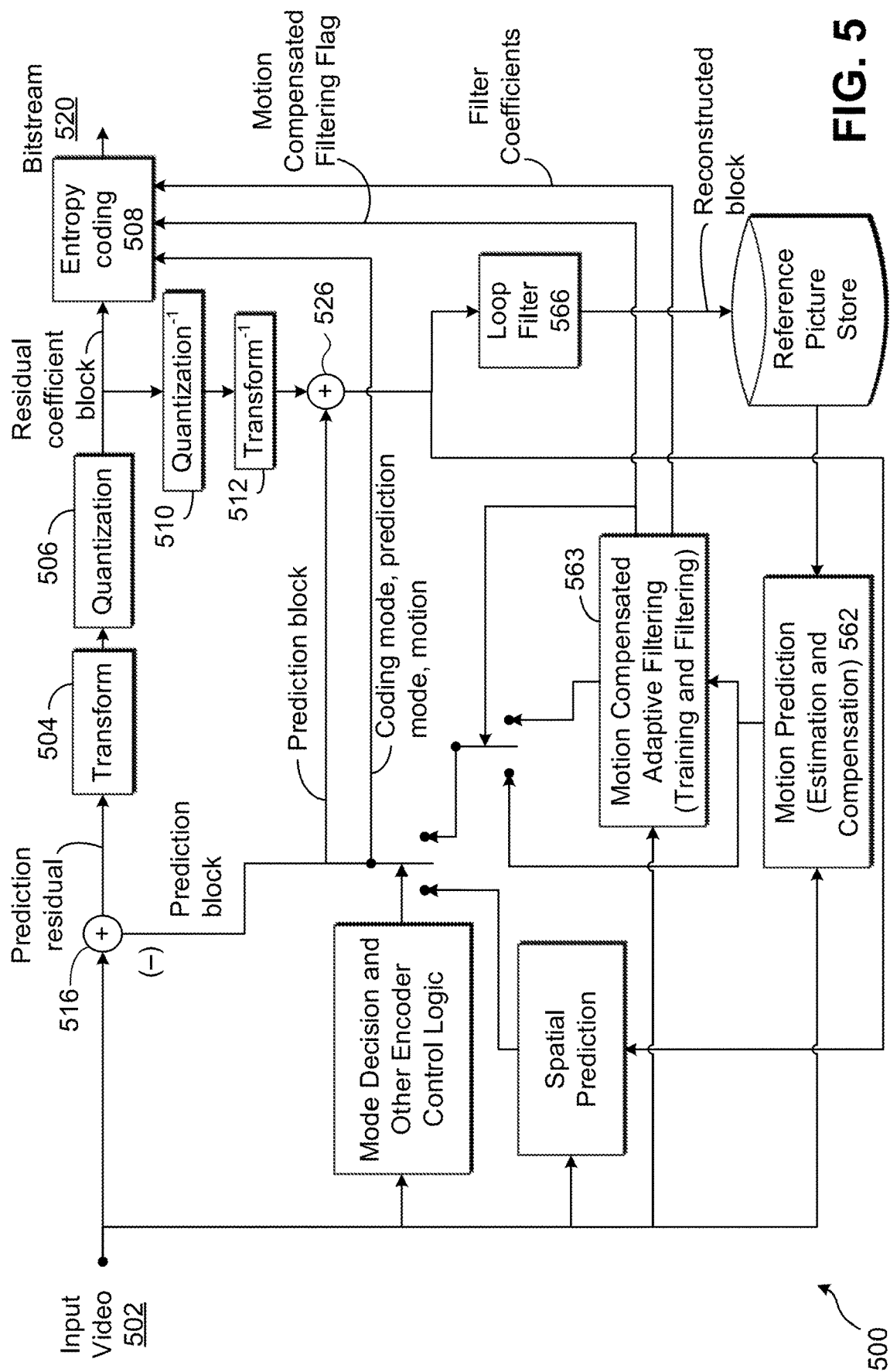
FIG. 5 is a schematic block diagram of an exemplary video encoder according to embodiments described herein.

FIG. 5 is a block diagram of an exemplary video encoder 500. A motion estimation and compensation module 562 generates the motion compensated signal by matching the current block to one block in the reference picture using the optimal MV. An additional module, namely motion compensated adaptive filtering 563, is introduced where the motion compensated signal is filtered with the proposed filtering processes to generate the filtered motion compensated signal. The original signal 502 is subtracted from the filtered motion compensated signal (at 516) to remove temporal redundancy and produce the corresponding residual signal. The transform 504 and quantization 506 are applied to the residual signal which are then entropy-coded (508) and output to the bit-stream 520. To obtain the reconstructed signal, the reconstructed residual signal is made available by inverse quantization 510 and inverse transform 512. The reconstructed residual is added (526) to the filtered motion compensated prediction. Further, in-loop filtering processes 566, e.g., de-blocking, ALF and sample adaptive offset (SAO), are applied to the reconstructed video signal for output. As discussed below, the filter coefficients of the proposed motion compensated filtering process may be derived by optimizing for all pixels in one picture/slice or one region, and they may not be optimal for the property of each video block. In order to improve the coding gain of the proposed method, a flag motion_compensated_filtering_flag may be signaled at a given block level (e.g., CTU, CU, or PU level) to indicate whether the proposed filtering is applied to the current block for motion compensation.

Figure 6:
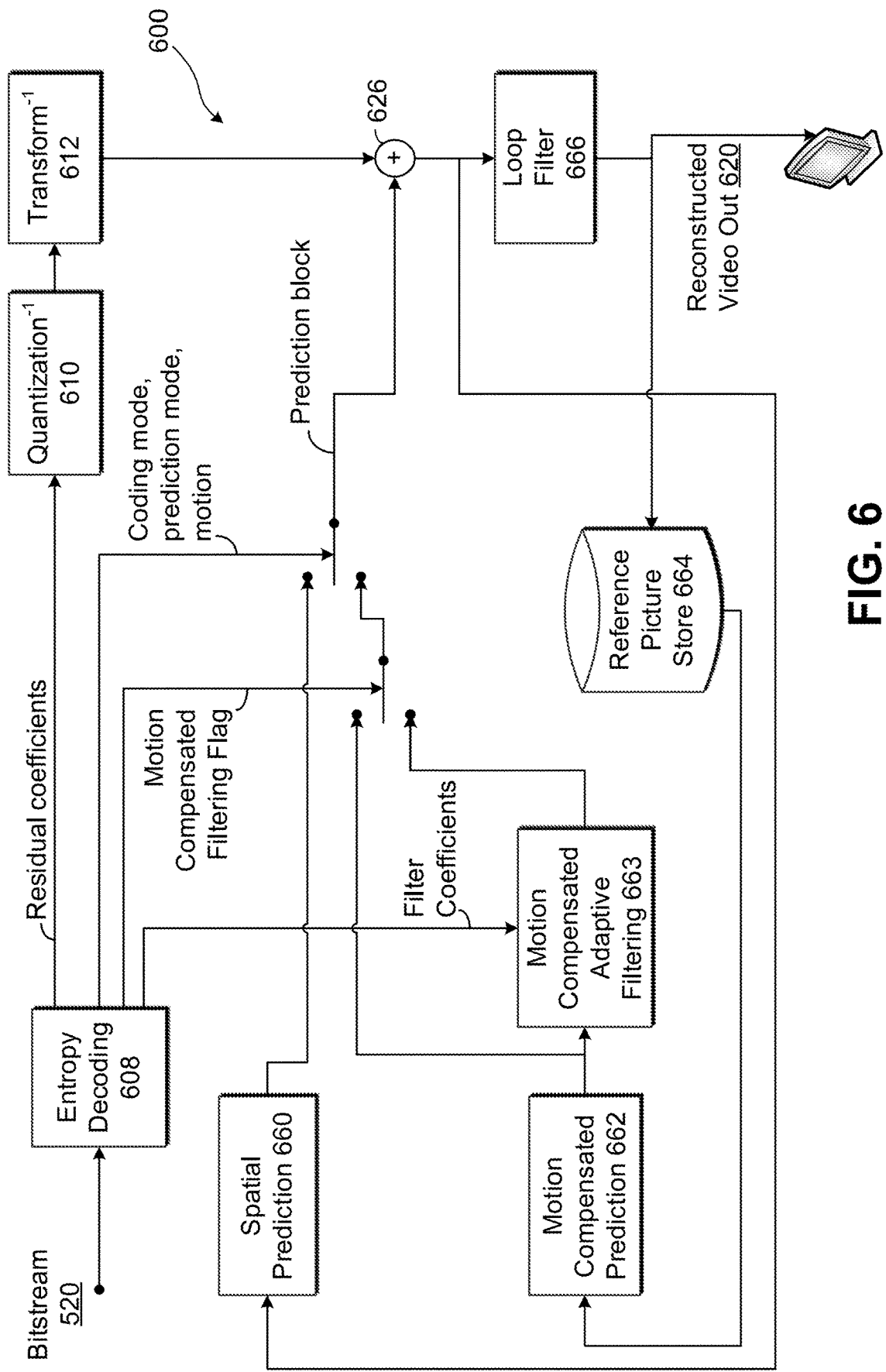
FIG. 6 is a schematic block diagram of an exemplary video decoder according to embodiments described herein.

FIG. 6 is a block diagram of an exemplary proposed decoder 600 that receives the bit-stream 520 produced by the encoder in FIG. 5. At the decoder, the bit-stream is parsed by the entropy decoder 608. The residual coefficients are then inverse quantized 610 and inverse transformed 612 to obtain the reconstructed residual. The coding mode and prediction information are used to obtain the prediction signal using either spatial prediction (660) or temporal prediction (662). For temporal prediction, a prediction signal is first generated by obtaining the motion compensated block using the signaled prediction information (e.g. MV and reference index). Then, if the decoded flag motion_compensated_filtering_flag is equal to 1, the prediction signal is further processed by the proposed motion compensated filtering 663; otherwise, if motion_compensated_filtering_flag is equal to 0, the prediction signal is not filtered. The prediction signal (either filtered or un-filtered) and the reconstructed residual are added together 626 to get the reconstructed video. The reconstructed video may additionally go through loop filtering 666 before being stored in the reference picture store 664 to be displayed 620 and/or to be used to decode future video signal.

Described herein are several systems and methods for providing a motion compensated signal built on the proposed encoding and decoding processes. Such systems and methods may be implemented using encoders and decoders such as those of FIGS. 5 and 6. In the following description, Section A describes systems and methods for enhancing a motion compensated signal for the luma component. Section B describes systems and methods for enhancing a motion compensated signal for the chroma components. Section C describes additional details regarding the implementation of the proposed motion compensated filtering systems and methods in a practical video coding system.

A. Generation of an Enhanced Motion Compensated Signal for the Luma Component.

With motion compensated prediction, the video signal in the current picture is predicted from the reconstructed signal of temporal neighboring reference pictures, which may contain unexpected noise and quantization errors. As a result, certain high-frequency information that is present in the original picture is now missing or distorted in the reconstructed picture. In order to compensate for the missing/distorted high-frequency information incurred by noise and quantization errors, systems and methods are described herein to apply a high-pass filtering process to the luma component of the motion compensated signal to improve the quality of the motion compensated prediction signal. For example, this figure may be obtained by minimizing the difference between the original signal and the filtered prediction signal. In an exemplary embodiment, a filter for a motion compensated luma signal is a 2D finite impulse response (FIR) filter which consists N×N taps and the filter coefficients are denoted by $f_L(x,y)$, where $$-\frac{N-1}{2} \leq x, y \leq \frac{N-1}{2}$$

and N is an odd number. Using such a filter, an exemplary high-pass filtering process for a motion compensated luma signal may be calculated by the 2D convolution as $$Y'(x, y) = Y(x, y) * f_L(x, y) + Y(x, y) \quad (6)$$

$$= \sum_{m=-\frac{(N-1)}{2}}^{\frac{(N-1)}{2}} \sum_{n=-\frac{(N-1)}{2}}^{\frac{(N-1)}{2}} Y(x-m, y-n) \times f_L(m, n) + Y(x, y)$$

where $Y(x,y)$ and $Y'(x,y)$ are the motion compensated luma signal before and after the filtering process; and * denotes the convolution operation. The filter coefficients $f_L(x,y)$ can be selected using, for example, linear minimum mean square error (LMMSE) estimation. Specifically, the LMMSE estimation method takes the original motion compensated signal $Y(x,y)$ and the original signal $Y_{org}(x,y)$ as input training set and optimizes the filter coefficients so that the difference between $Y_{org}(x,y)$ and $Y'(x,y)$ is minimized, as indicated as follows:

$$f_L^* = \operatorname{argmin} \sum_x \sum_y |Y'(x, y) - Y_{org}(x, y)|^2 \quad (7)$$

$$= \operatorname{argmin} \sum_x \sum_y \left[ \left( \sum_{m=-\frac{(N-1)}{2}}^{\frac{(N-1)}{2}} \sum_{n=-\frac{(N-1)}{2}}^{\frac{(N-1)}{2}} Y(x-m, y-n) \times f_L(m, n) \right) + Y(x, y) - Y_{org}(x, y) \right]^2$$

As shown in FIGS. 5 and 6, the selected filter coefficients are transmitted from the encoder to repeat the same filtering process during the motion compensation (if the block-level filtering flag is on) at the decoder. Unlike the low-pass Wiener filter used by the ALF process, the filter coefficients in the proposed method as derived by Equation (7) are typically asymmetric; correspondingly, all the N×N filter coefficients may be transmitted, which could consume a lot of signaling overhead. To reduce the overhead of filter coefficient signaling, in some embodiments, a symmetry constraint may be applied during the filter derivation process such that the filter coefficients at equal distance from the center location have the same coefficient value (therefore the number of filter coefficients signaled may be reduced).

In some embodiments, the selected filter coefficients are constrained to be coefficients of a high-pass filter by requiring that the sum the filter coefficients be equal to (or to be within a predetermined distance from) zero. Alternatively, other constraints may be imposed on the coefficients to ensure that the filter is a high-pass filter. In an embodiment where the high-pass nature of the proposed filtering is ensured by enforcing that the summation of all the filter coefficients derived by Equation (7) are equal to 0, it is noted that one coefficient may be inferred (by subtracting the sum of all other coefficients from zero) and thus need not be explicitly signaled in the bitstream. Finally, given the varying characteristics of luma samples in the motion compensated picture, classification methods (e.g., the classification method based on Laplacian activity in [5]) may be applied to classify the motion compensated luma samples into different groups, and optimize and apply high-pass filters with different characteristics to each group individually.

Figure 7:
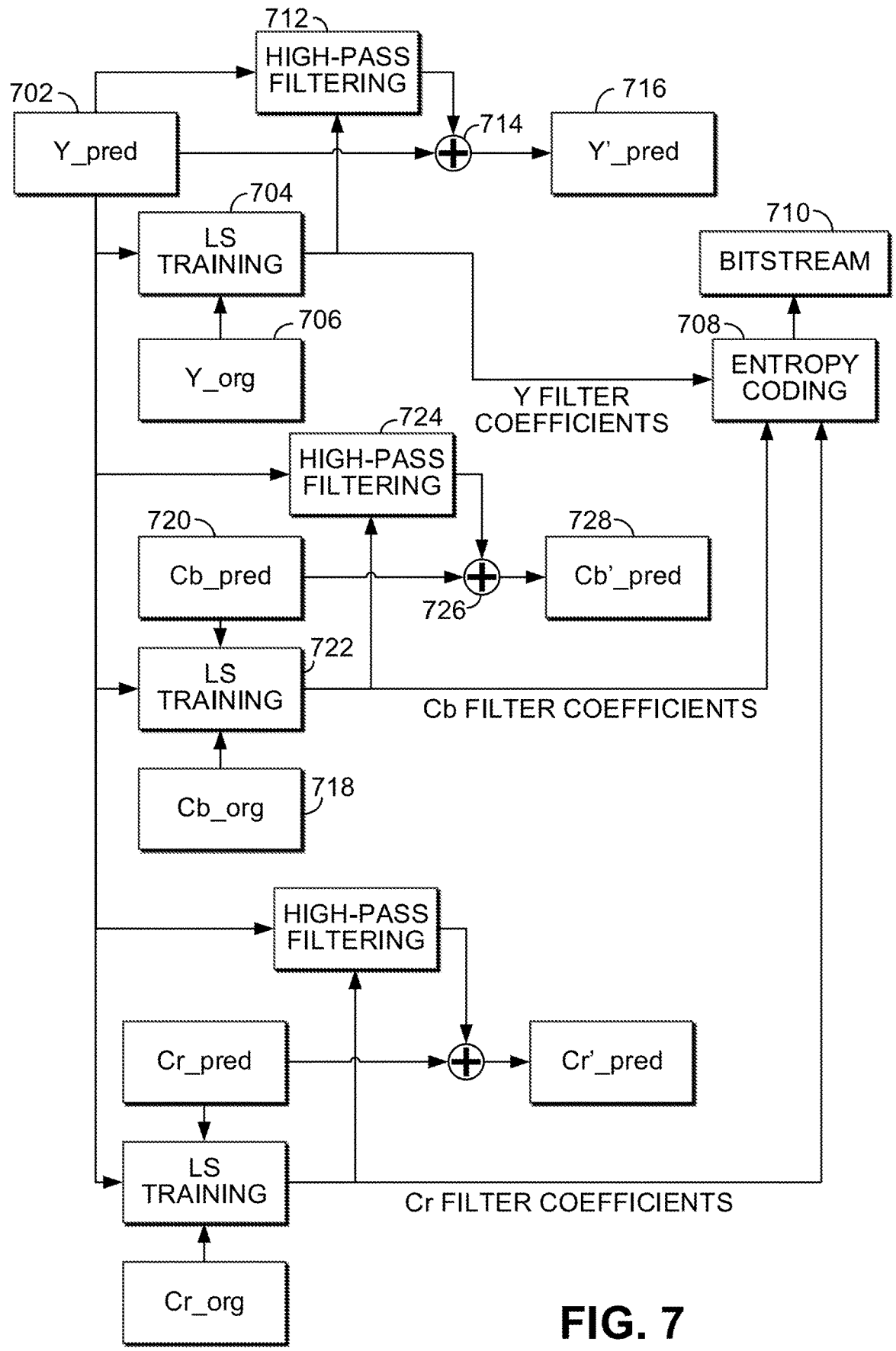
FIG. 7 is a flow diagram of an exemplary motion compensated filtering process performed at an encoder for a Y component, a Cb component, and a Cr component.

In an exemplary encoding embodiment illustrated in FIG. 7, the luma component Y_pred of a motion-compensated prediction signal is provided at 702. At 704, least-squares training (or other types of training) selects high-pass filter coefficients using a comparison of the luma component Y_pred and the luma component Y_org (706) of the original picture. The selected filter coefficients are then entropy coded (708) for efficient signaling in a bitstream 710. In this exemplary encoding process, the high-pass filter defined by the selected filter coefficients is applied at 712 to the motion-compensated luma component Y_pred, to generate a filtered output, and the filtered output is added at 714 to the signal Y_pred to generate a modified motion-compensated luma component Y'_pred (716). Additional features illustrated in FIG. 7 relate to enhanced motion-compensated chroma prediction and are described in greater detail in a subsequent section.

Figure 8:
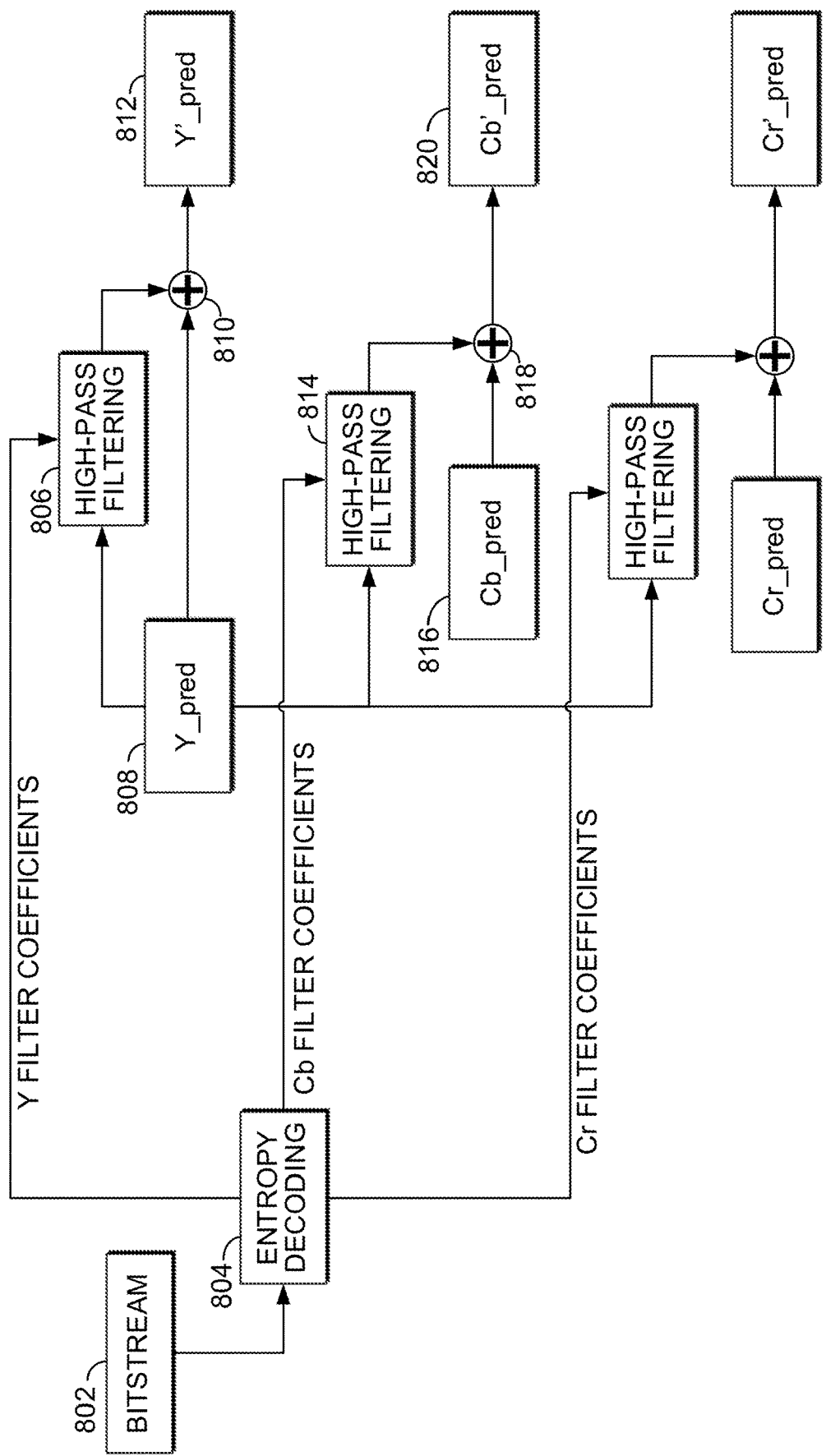
FIG. 8 is a flow diagram of an exemplary motion compensated filtering process performed at a decoder for a Y component, a Cb component, and a Cr component.

In an exemplary decoding embodiment illustrated in FIG. 8, a bitstream 802 is received and undergoes entropy decoding 804 to obtain filter coefficients, such as the Y filter coefficients used in generating a modified motion-compensated luma signal. A high-pass filter defined by the signaled Y filter coefficients is applied at 806 to the luma component Y_pred (808) of the motion-compensated prediction signal. The filtered output from filtering 806 is added at 810 to the original Y_pred signal to generate the modified luma signal Y'_pred (812). Additional features illustrated in FIG. 8 relate to enhanced motion-compensated chroma prediction and are described in greater detail in a subsequent section.

It may be noted that in some embodiments, the steps of high-pass filtering (e.g. step 806) and adding the result to the prediction signal (e.g. step 810) may be performed together in a single calculation, e.g. as in Equation (6), without departing from the scope of the embodiments disclosed herein.

B. Generation of Enhanced Motion Compensated Signal for Chroma Components.

Since the human vision system is much more sensitive to variations in brightness than color, a video coding system usually devotes more bits to the luma component than chroma components, e.g., by adjusting the QP delta value between luma component and chroma components. Therefore, chroma components are often smoother than the luma component. As a result, more transform coefficients are quantized to zero and there will be more blurred edges and textures in the reconstructed chroma signal. This could reduce the prediction efficiency for chroma and consequently more overhead is spent on coding chroma residuals. Although ALF may be applied to reduce the distortion between the reference chroma signal and the original chroma signal, it cannot recover the high-frequency information that is missing in reconstructed chroma signal, due to the low-pass characteristics of ALF filters. In one embodiment of this disclosure, the high-pass filtering method for luma as described in Section A may be applied to chroma planes to improve the high frequency information of the chroma components. However, directly applying high-pass filtering to chroma planes is not necessarily an efficient way to recover the high-frequency information, given that reconstructed chroma planes are so smooth that not much useful high-frequency information can be extracted from the chroma signal itself. In the following, methods to enhance motion compensated chroma signal are described using 4:2:0 chroma format as example. However, it is apparent that various embodiments as discussed hereafter are applicable other chroma formats.

In another embodiment, the blurred edges and textures in chroma planes of the temporal prediction signal may be restored or repaired by using the corresponding neighboring samples in the luma plane. In this disclosure, it is proposed in an embodiment to apply a cross-plane filtering during the motion compensation stage which uses the high-frequency information of the motion compensated luma signal as guidance to improve the quality of the motion compensated chroma signal. For example, consider a case where $C(x,y)$ and $C'(x,y)$ indicate the original reconstructed chroma sample and the filtered reconstructed chroma samples at the coordinate $(x,y)$; $f_L(x,y)$ indicate the coefficients of the high-pass filter that is applied to the corresponding H×L neighboring region of reconstructed luma samples $Y(2x-i, 2y-j)$, where $$-\frac{H-1}{2} \leq x \leq \frac{H-1}{2}, -\frac{L-1}{2} \leq y \leq \frac{L-1}{2}.$$

In such an embodiment, the proposed cross-plane high-pass filtering can be calculated as $$C'(x, y) = Y(2x, 2y) * f_C(x, y) + C(x, y) \quad (8)$$

$$= \sum_{i=-\frac{(H-1)}{2}}^{\frac{(H-1)}{2}} \sum_{j=-\frac{(L-1)}{2}}^{\frac{(L-1)}{2}} f_C(i, j) \times Y(2x-i, 2y-j) + C(x, y)$$

In some embodiments, to derive the filter coefficients $f_C(x,y)$, an LMMSE estimation used, taking the motion compensated luma signal $Y(2x,2y)$, the original motion compensated chroma signal $C(x,y)$ and the original chroma signal $C_{org}(x,y)$ as input and optimizing the filter coefficients $f_C(i,j)$ such that the difference between $C_{org}(x,y)$ and $C'(x,y)$ is minimized, as described as follows:

$$f_C^* = \mathrm{argmin} \sum_x \sum_y |C'(x, y) - C_{org}(x, y)|^2 \quad (9)$$

$$= \mathrm{argmin} \sum_x \sum_y \left[ \left( \sum_{i=-\frac{(H-1)}{2}}^{\frac{(H-1)}{2}} \sum_{j=-\frac{(L-1)}{2}}^{\frac{(L-1)}{2}} f_C(i, j) \times Y(2x-i, 2y-j) \right) + C(x, y) - C_{org}(x, y) \right]^2$$

As described above with respect to the derivation of the high-pass filter coefficients for the luma component in Equation (7), a symmetry constraint and/or zero summation constraint may also be applied to Equation (9) for the motion compensated chroma signal to reduce the signaling overhead and ensure the high-pass characteristic of the derived chroma filter coefficients.

In the encoding embodiment of FIG. 7, for encoding of the Cb component, an original Cb signal Cb_org (718), the luma prediction signal Y_pred (702), and the chroma prediction signal Cb_pred 720 are used in least-squares training 722 to select high-pass filter coefficients, e.g. using Equation (9). The Cb filter coefficients are provided for entropy coding 708 and are signaled in bitstream 710. The high-pass filter defined by those selected Cb filter coefficients is applied at 724 to the Y_pred signal, and the filtered output is added at 726 to the Cb_pred signal to generate modified signal Cb'_pred (728). As illustrated in FIG. 7, an analogous process may also be applied to a Cr prediction signal Cr_pred to generate a modified prediction signal Cr'_pred.

In the decoding embodiment of FIG. 8, filter coefficients for chroma components Cb and Cr are obtained through entropy decoding 804. At 814, the high-pass filter defined by the signaled Cb filter components is applied to the luma component Y_pred (808) of the motion-compensated prediction signal to generate a filtered output. The filtered output is added to the Cb component Cb_pred of the motion compensated signal at 818 to generate a modified signal Cb'_pred (820). As illustrated in FIG. 8, analogous processing may also be performed for chroma component Cr.

In the embodiments of FIG. 7 and FIG. 8, cross-plane filtering is applied on the original luma reference signal to enhance the corresponding chroma signals during the motion compensation stage. However, in some cases, it may not be optimal to directly apply high-pass filter to the original motion compensated luma signal to exact high-frequency information for chroma, due to the noise and quantization errors resulting from the coding process of luma component. To further improve the efficiency of motion compensation for chroma, as one embodiment of the disclosure, it is proposed to firstly apply high-pass filtering (as discussed in Section A) to enhance the motion compensated luma prediction, and then the output of enhanced luma prediction is used as input of the cross-plane filtering to enhance the corresponding motion compensated chroma prediction. Using the same notations in FIGS. 7 and 8, FIGS. 9 and 10 illustrate an exemplary motion compensated filtering process at the encoder and decoder, respectively, in an embodiment in which the enhanced luma prediction signal Y'_pred is used as input to derive and apply the cross-plane filtering for chroma prediction signals. Compared to the methods in FIGS. 7 and 8, the methods in FIGS. 9 and 10 may achieve better prediction efficiency for chroma components, which however may come at the expense of increased parallel encoding/decoding complexity. This is because after making the cross-plane filtering dependent on the enhanced luma prediction signal, the cross-plane filter training/application is not invoked until the luma samples in the motion compensated signal are processed by the luma high-pass filtering process. In comparison, the methods of FIG. 7 and FIG. 8 directly use the unfiltered luma prediction signal for the cross-plane filtering, therefore the motion compensated filtering processes of luma and chroma components can be conducted in parallel.

Figure 9:
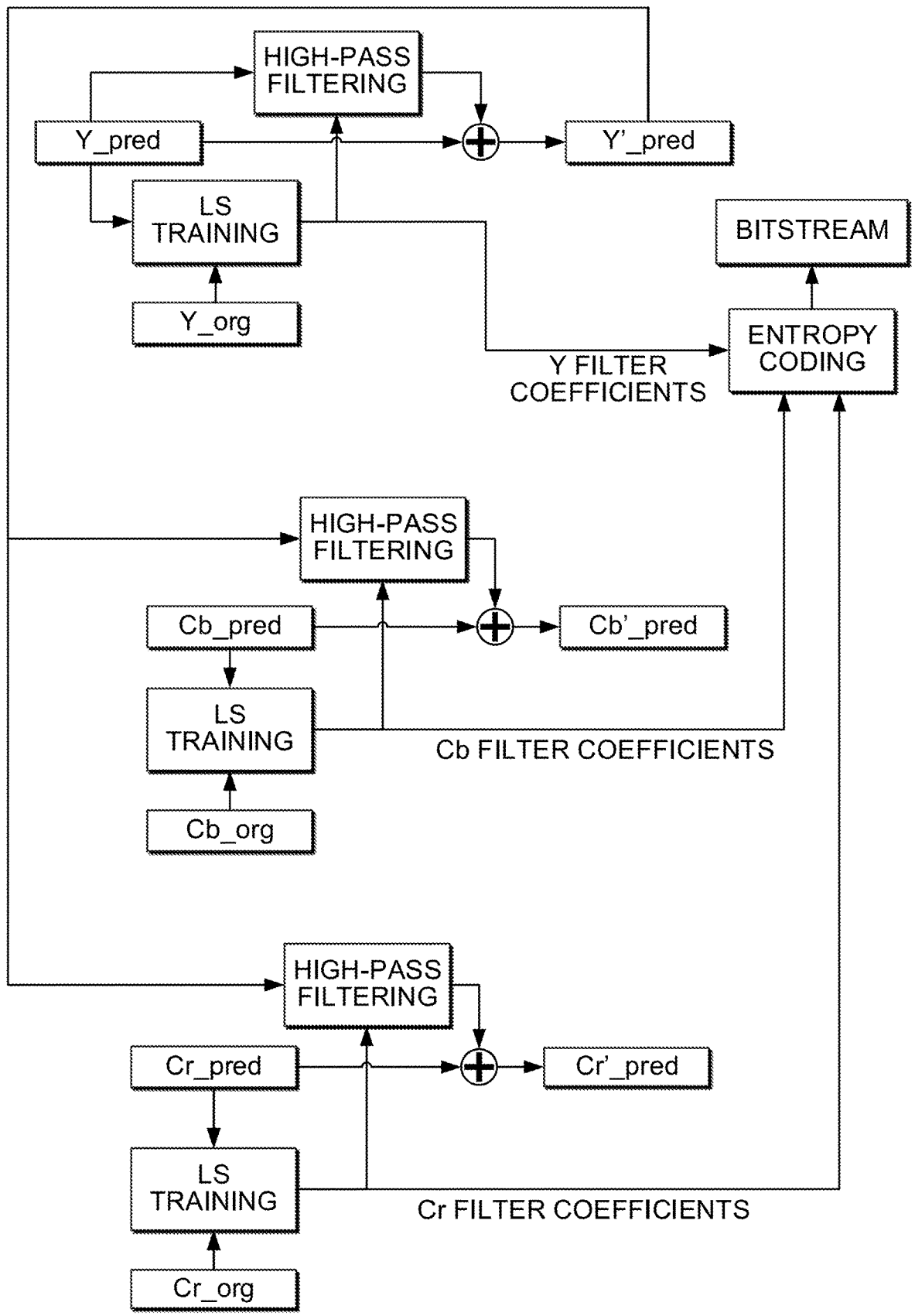
FIG. 9 is a flow diagram of an exemplary motion compensated filtering process performed at an encoder for a Y component, a Cb component, and a Cr component, in an embodiment using the enhanced luma prediction for the cross-plane filtering of chroma components.
Figure 10:
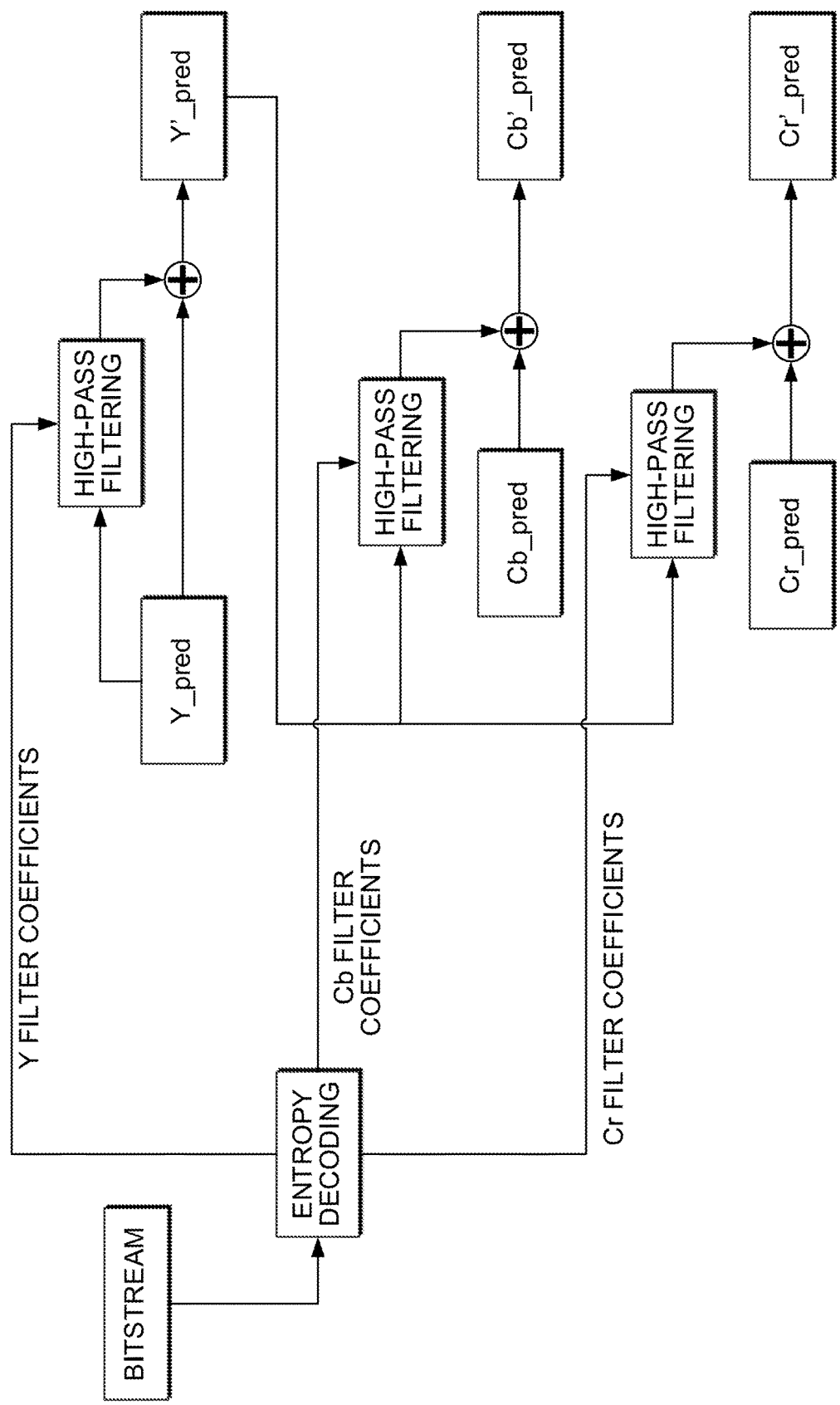
FIG. 10 is a flow diagram of an exemplary motion compensated filtering process performed at a decoder for a Y component, a Cb component and a Cr component, in an embodiment using the enhanced luma prediction for the cross-plane filtering of chroma components.

In the exemplary embodiments of FIGS. 9 and 10, cross-component filtering is applied to the enhanced motion compensated luma signal to improve the quality of chroma prediction. Although this method may achieve better prediction of chroma components, it increases the latency between the motion estimation and compensation processes of luma and chroma components, given that the motion compensated filtering of chroma components uses the enhanced luma prediction as input and only begins after the luma prediction samples are high-pass filtered. However, because both the enhanced filtering process of the motion-compensated luma component (as described in Section A) and the cross-component filtering process of the motion-compensated chroma component (as described in Section B) are linear filters, the combination of the enhanced filtering for luma prediction and the cross-component filtering for chroma prediction (as shown in FIGS. 9 and 10) is approximately equivalent to applying the cross-component filtering to an extended area of luma predication samples in order to enhance the chroma prediction. (Without the intermediate bit shifts and precision considerations, performing one-step filtering with extended filter support and performing two-step filtering can be strictly equivalent; with intermediate bit shifting and precision considerations, these two are approximately equivalent). In such a method, as the cross-component filtering directly uses the original luma predication samples (the motion-compensated luma samples without enhancement with high-pass filtering) as input, motion compensated filtering of luma and chroma components can be processed in parallel.

Figure 12:
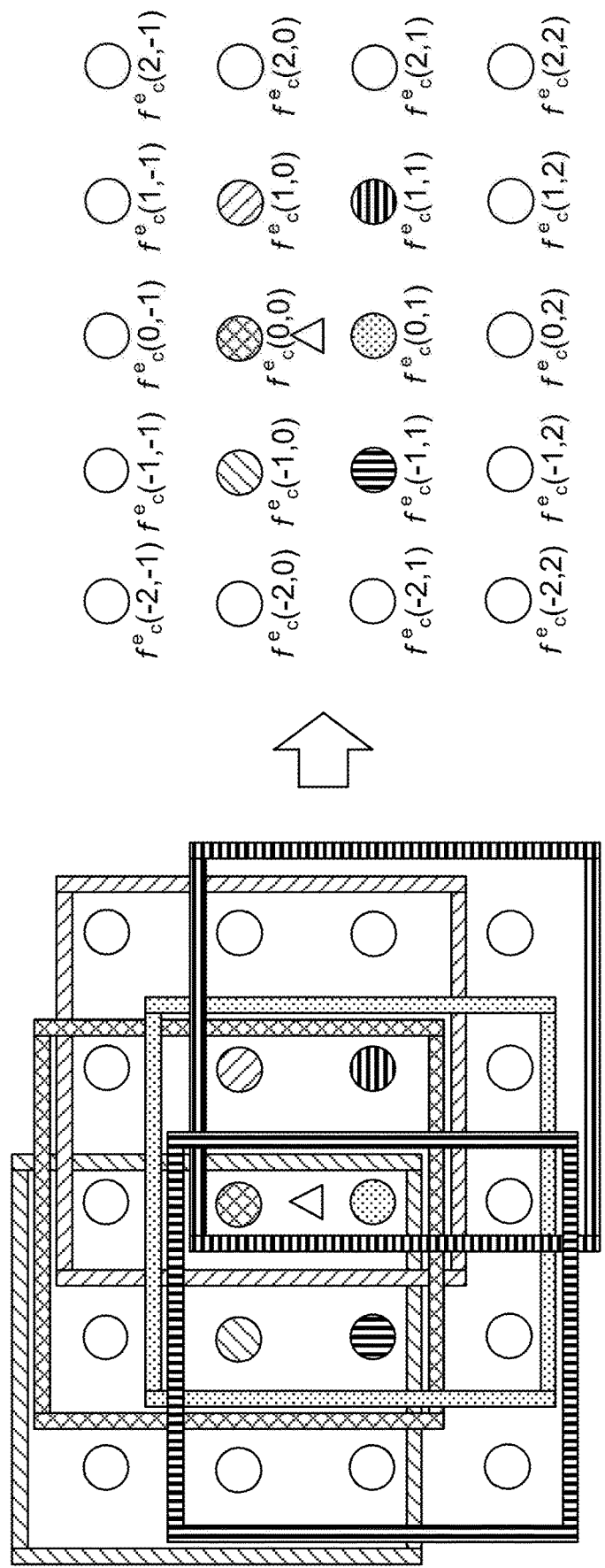
FIG. 12 illustrates exemplary extended cross-component filtering of motion compensated chroma prediction.

In an exemplary embodiment, the enhancement filter of motion-compensated luma samples is one 2D 3×3 filter and the filter coefficients are denoted by (x,y), where $-1 \le x, y \le 1$; the cross-component filter of the motion-compensated chroma is one 2D 3×2 and the filter coefficients are denoted by $f_C(x,y)$, where $-1 \le x \le 1$, $0 \le y \le 1$. FIG. 12 presents one example to illustrate the extended cross-component filtering in 4:2:0 chroma format. In the illustration of FIG. 12, the triangle and the patterned circles represent the target chroma sample and the corresponding luma samples that are used by cross-component filtering. Squares rendered in different forms of hatching enclose the neighboring luma samples (as indicated by blank circles) that are used to generate the reference luma samples (represented by a circle filled in with the same pattern as the corresponding square) used for enhancing the target chroma sample. As shown in FIG. 12, because two enhancement filters of luma and chroma components are linear, combining two filters together is equivalent to applying one cross-component filter with increased length (i.e., 5×4) to an extended luma prediction region, with the filter coefficients $f_c^e(x,y)$, where $-2 \le x < 2$, $-1 \le y \le 2$, as derived as shown in Equation (10).

$f_c^e(-2,-1) = f_C(-1,0) \times F_L(-1,-1)$ $f_c^e(-1,-1) = f_C(-1,0) \times f_L(0,-1) + f_C(0,0) \times f_L(-1,-1)$ $f_c^e(0,-1) = f_C(-1,0) \times f_L(1,-1) + f_C(0,0) \times f_L(0,-1) + f_C(1,0) \times f_L(-1,-1)$ $f_c^e(1,-1) = f_C(0,0) \times f_L(1,-1) + f_C(1,0) \times f_L(0,-1)$ $f_c^e(2,-1) = f_C(1,0) \times f_L(1,-1)$ $f_c^e(-2,0) = f_C(-1,0) \times f_L(-1,0) + f_C(-1,1) \times f_L(-1,-1)$ $f_c^e(-1,0) = f_C(-1,0) \times f_L(0,0) + f_C(0,0) \times f_L(-1,0) + f_C(-1,1) \times f_L(0,-1) + f_C(0,1) \times f_L(-1,-1) + f_C(-1,0)$ $f_c^e(0,0) = f_C(-1,0) \times f_L(1,0) + f_C(0,0) \times f_L(0,0) + f_C(1,0) \times f_L(-1,0) + f_C(-1,1) \times f_L(1,-1) + f_C(0,1) \times f_L(0,-1) + f_C(1,1) \times f_L(-1,-1) + f_C(0,0)$ $f_c^e(1,0) = f_C(0,0) \times f_L(1,0) + f_C(1,0) \times f_L(0,0) + f_C(0,1) \times f_L(1,-1) + f_C(1,1) \times f_L(0,-1) + f_C(1,0)$ $f_c^e(2,0) = f_C(1,0) \times f_L(1,0) + f_C(1,1) \times f_L(1,-1)$ $f_c^e(-2,1) = f_C(-1,0) \times f_L(-1,1) + f_C(-1,1) \times f_L(-1,0)$ $f_c^e(-1,1) = f_C(-1,0) \times f_L(0,1) + f_C(0,0) \times f_L(-1,1) + f_C(-1,1) \times f_L(0,0) + f_C(0,1) \times f_L(-1,0) + f_C(-1,1)$ $f_c^e(0,1) = f_C(-1,0) \times f_L(1,1) + f_C(0,0) \times f_L(0,1) + f_C(1,0) \times f_L(-1,1) + f_C(-1,1) \times f_L(1,0) + f_C(0,1) \times f_L(0,0) + f_C(1,1) \times f_L(-1,0) + f_C(0,1)$ $f_c^e(1,1) = f_C(0,0) \times f_L(1,1) + f_C(1,0) \times f_L(0,1) + f_C(0,1) \times f_L(1,0) + f_C(1,1) \times f_L(0,0) + f_C(1,1)$ $f_c^e(2,1) = f_C(1,0) \times f_L(1,1) + f_C(1,1) \times f_L(1,0)$ $f_c^e(-2,2) = f_C(-1,1) \times f_L(-1,1)$ $f_c^e(-1,2) = f_C(-1,1) \times f_L(0,1) + f_C(0,1) \times f_L(-1,1)$ $f_c^e(0,2) = f_C(-1,1) \times f_L(1,1) + f_C(0,1) \times f_L(0,1) + f_C(1,1) \times f_L(-1,1)$ $f_c^e(1,2) = f_C(0,1) \times f_L(1,1) + f_C(1,1) \times f_L(0,1)$ $f_c^e(2,2) = f_C(1,1) \times f_L(1,1)$ C. Aspects of Implementing Motion Compensated Adaptive Filtering in Video Coding Systems.

Coding of Filter Coefficients.

As shown in FIGS. 5 and 6, selected (e.g. optimized) filter coefficients may be transmitted from the encoder to repeat the same filtering process during the motion compensation at the decoder. The trained filters have real value coefficients, which are quantized before transmission. Without loss of generality, consider an example of quantization of luma filter coefficients. The quantization of chroma filter components may readily be understood by analogy. The real value luma filter $f_L$ can be uniformly quantized using a quantization step size $q_c$ and can be approximated by an integer value filter (denoted $f_L^{Int}$) as described as:

$$f_L = f_L^{Int} \times q_c \qquad (11)$$

Further, the quantization step $q_c$, which is real value, can be approximated by a multiplication of one integer factor M followed by a N-bit right shift, as shown as $$f_L = f_L^{Int} \times q_c \approx f_L^{Int} \times \frac{M}{2^N} \qquad (12)$$

In this way, to transmit the filter coefficients $f_L$, the quantized filter coefficients $f_L^{Int}$ together with the factors M and N, or only the quantized filter coefficients $f_L^{Int}$ if the encoder and decoder use the same M and N, are coded in the bit-stream. Since the error resulting from the coefficient quantization could significantly degrade the coding performance, and because luma and chroma components may show quite different statistical characteristics, the quantization step size for the proposed motion compensated filtering methods is selected with care. In one embodiment of the disclosure, it is proposed to use the same quantization step size (as determined by M and N) for both the filtering of luma and chroma. In other embodiment, it is proposed to use different quantization step sizes for luma and chroma separately.

Additionally, as discussed in Section A, due to the varying characteristics of samples in the motion compensated signal, classification methods may be applied to classify the motion compensated samples (either luma or chroma) into different groups and to optimize and apply high-pass filters with different characteristics to each group individually. One exemplary classification method that can be used is a method based on Laplacian activity described in [5]. In embodiments where different groups are used, a prediction method may be applied between the different groups of filter coefficients to reduce the overhead of filter coefficient signaling. For example, one flag may be signaled to indicate whether one group of filter coefficients is predicted from its previous neighboring group: if the flag is equal to 0, all the coefficients in the group will be directly coded; otherwise, if the flag is equal to 1, instead of coding the coefficients directly, the coefficients of the group will be predicted from the corresponding coefficients of the previous group and only the prediction residuals are coded. Different groups of filter coefficients may use the same quantization parameters N and M, or different quantization parameters N and M.

Filter coefficient adaptation. When the proposed motion compensated filtering method employed in various embodiments, the adaptation of the filter coefficients can be applied at various coding levels, such as sequence-level, picture/slice-level and/or block-level; and each adaptation level could provide a different trade-off between coding efficiency and encoding/decoding complexity. For example, if filter coefficients are adapted at sequence-level, the encoder derives the filter coefficients for the whole video sequence, and all the filter coefficients as well as the decision on whether to apply the motion compensated filtering may be carried in sequence-level parameter set, such as video parameter set (VPS) and sequence parameter set (SPS). If filter coefficients are adapted at picture-level, the encoder derives the filter coefficients for one picture, and all the filter coefficients as well as the decision on whether to apply the motion compensated filtering may be carried in a picture-level parameter set, such as picture parameter set (PPS). If filter coefficients are adapted at slice-level, the encoder derives the filter coefficients for each individual slice, and all the filter coefficients as well as the decision on whether to apply the motion compensated filtering may be carried in a slice header.

Exemplary filtering methods described herein may be beneficial only to regions which have rich edge and texture information, as those are the regions in which it is useful to recover the high-frequency information in a motion compensation signal. Taking this into consideration, a region-based filter coefficient adaptation method is applied in some embodiments, where the motion compensated filters are signaled for different regions and are only applied to the regions that contain abundant high-frequency details. In this way, the high-pass filters would not be applied to the prediction samples in flat areas, which could reduce encoding/decoding complexity. Whether the region is flat or not can be determined based on motion compensated luma samples. One method is to calculate the average magnitude of gradients within the region using motion compensated luma samples. If the average magnitude of gradients is smaller than the threshold, then the region may be classified as a flat region and the enhancement filtering may not be applied in the region. The threshold value may be predetermined or may be selected adaptively based on the average gradient in reference pictures. The high pass filter may be related to the edge directions. Another adaptation may signal filters based on the edge directions. In such an embodiment, the edge direction information may be derived from the motion compensated luma signal. Within a local window where the filter is applied at the center pixel, the dominant direction will be treated as the direction of center pixel.

Like H.264/AVC, HEVC allows the use of multiple reference pictures. With the proposed high pass filtering scheme, a same set of filter coefficients for each color component may be signaled and applied regardless of the reference picture(s) used in prediction ("combined filters"). Alternatively, different filter coefficients may be signaled for and associated with different reference pictures ("dedicated filters"). Then, depending on which reference picture(s) are used to obtain the motion compensated prediction signal, the corresponding filter coefficients may be used to enhance the motion compensated prediction signal. The latter method may produce better filtered results, but may have higher signaling cost. To balance the signaling cost and effectiveness, dedicated filters may be used for frequently used reference pictures, and combined filters may be used for less frequently used reference pictures. Or, dedicated filters may be used for some color components (e.g. the luma component) but not others (e.g. chroma components).

At the encoder side, when estimating the filters, the motion compensated signals are used in some embodiments to perform LMMSE (equation (7) for the high-pass luma filter and equation (9) for the cross-component filter). Initial or preliminary motion information (motion vectors and/or reference pictures) is used to obtain the motion compensated signals. Such initial or preliminary motion information may come from multi-pass encoding of the current picture (that is, a first encoding pass is performed to obtain motion information), or it may come from a previously encoded picture through motion trajectory estimation. Given that successive pictures are highly correlated, the coefficients of high-pass filters for temporal neighboring pictures may be similar; therefore, the motion compensated signal and the original signal of previously encoded picture(s), e.g., the nearest previous picture in the encoding/decoding order, may be used as input of the LMMSE processes for the current picture. Compared to a multi-pass method, both the motion trajectory estimation method and the estimation method using previously encoded pictures only need one single encoding pass, therefore significantly reducing encoding complexity. However, as the LMMSE inputs are not from the current picture, filter coefficients derived using either of those two methods may have reduced effectiveness.

Decoder-Side Filter Coefficient Derivation.

Figure 11:
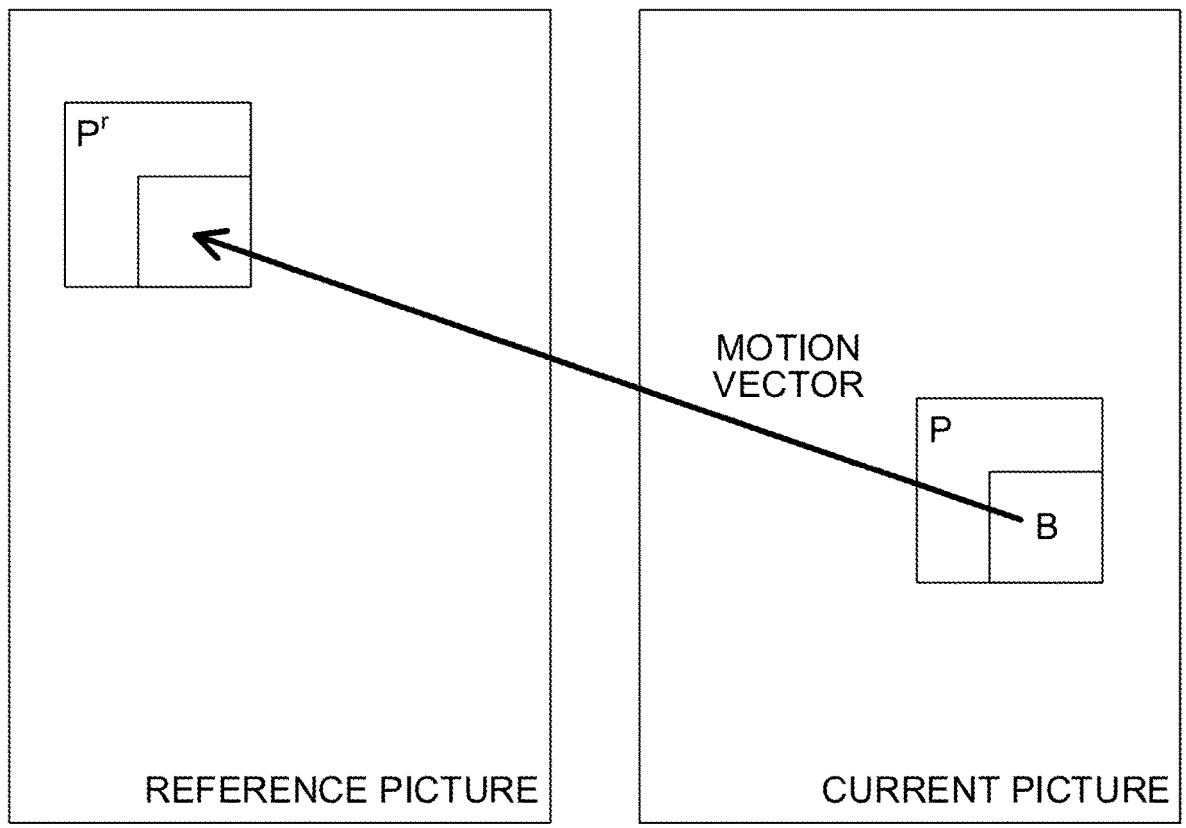
FIG. 11 illustrates exemplary decoder-side derivation of filter coefficients for motion compensated filtering.

In some exemplary methods, filter coefficients are signaled from the encoder to the decoder, which may consume a non-negligible portion of the output bit-steam and therefore reduce the overall coding performance. To reduce the overhead, in other embodiments, a decoder-side method is implemented where all or part of the coefficients of the proposed motion compensated filtering are derived at the decoder side. Specifically, when the motion compensated filtering is applied to one block (e.g., when the motion_compensated_filtering_flag is equal to 1), instead of indicating the filter coefficients in the bit-stream, the exemplary method derives the coefficients from the neighboring samples of the current block and the corresponding reference samples in the reference picture. FIG. 11 illustrates a proposed decoder-side filter coefficient derivation method. Specifically, given one block B and its pre-defined neighboring region P (e.g., the reconstructed samples in P), the corresponding reference region $P^r$ in the reference picture may be found using the coded MV of the current block. Then the LMMSE method may be employed to derive the filter coefficients by taking $P^r$ and P as the unfiltered motion compensated signal and the target signal for the training processes as specified in equation (7) (for luma high-pass filter) and equation (9) (for cross-plane filters). After that, the derived filters may be applied to enhance the prediction signal of the current block.

As shown in FIG. 11, as the proposed method takes the motion compensated samples of a neighboring region as the original signal (the target for LMMSE estimation in equations (7) and (9), it may be more beneficial to apply the proposed decoder-side derivation method when the reconstructed signal of the current picture contains higher quality reconstructed information than that of the reference picture. Therefore, in an exemplary embodiment, the proposed decoder-side derivation method is only applied when samples in P use a smaller QP value than samples in $P^r$.

Handling Uni-Prediction Vs. Bi-Prediction in Motion Compensated Filtering.

Similar to existing video coding standards, HEVC employs two main prediction types for motion compensated prediction, namely uni-prediction and bi-prediction. For uni-prediction, one uni-directional prediction is applied where each block can be predicted using at most one motion-compensated block from one reference picture. For bi-prediction, bi-directional prediction is applied where one block can be predicted by averaging two motion-compensated blocks from two reference pictures. All the motion compensated filtering methods illustrated in FIGS. 7-11 have been described from the perspective of embodiments in which the prediction signal of the current video block to be coded is from one prediction direction, i.e., uni-prediction. For bi-prediction blocks, the proposed motion compensated filtering scheme can be applied in different ways.

In one method using bi-prediction, the same filtering processes (both the luma high-pass filter and chroma cross-plane filter) are applied to enhance the prediction signals for both uni-prediction and bi-prediction by applying the same high-pass filters (either luma high-pass filters or cross-component filters) to the output prediction signals of two prediction types. Specifically, in this method, the encoder/decoder generate the motion compensated prediction of the coded video by fetching the reference block from the reference picture for uni-prediction or averaging two reference blocks from two reference pictures for bi-prediction. Then, the proposed high-pass filtering and cross-component filtering are applied to enhance the quality of the motion compensated luma and chroma signals. Accordingly, to derive the filter coefficients, the LMMSE estimation uses the output motion compensated signal (the average of two prediction signals for bi-prediction) and the original signal as input and optimizes the filter coefficients to minimize the difference between two inputs. In an embodiment in which the original luma prediction signal is used to enhance the chroma prediction signal, FIGS. 13 and 14 illustrate the proposed filtering process for bi-prediction block when the first method is used at encoding and decoding processes, respectively.

Figure 13:
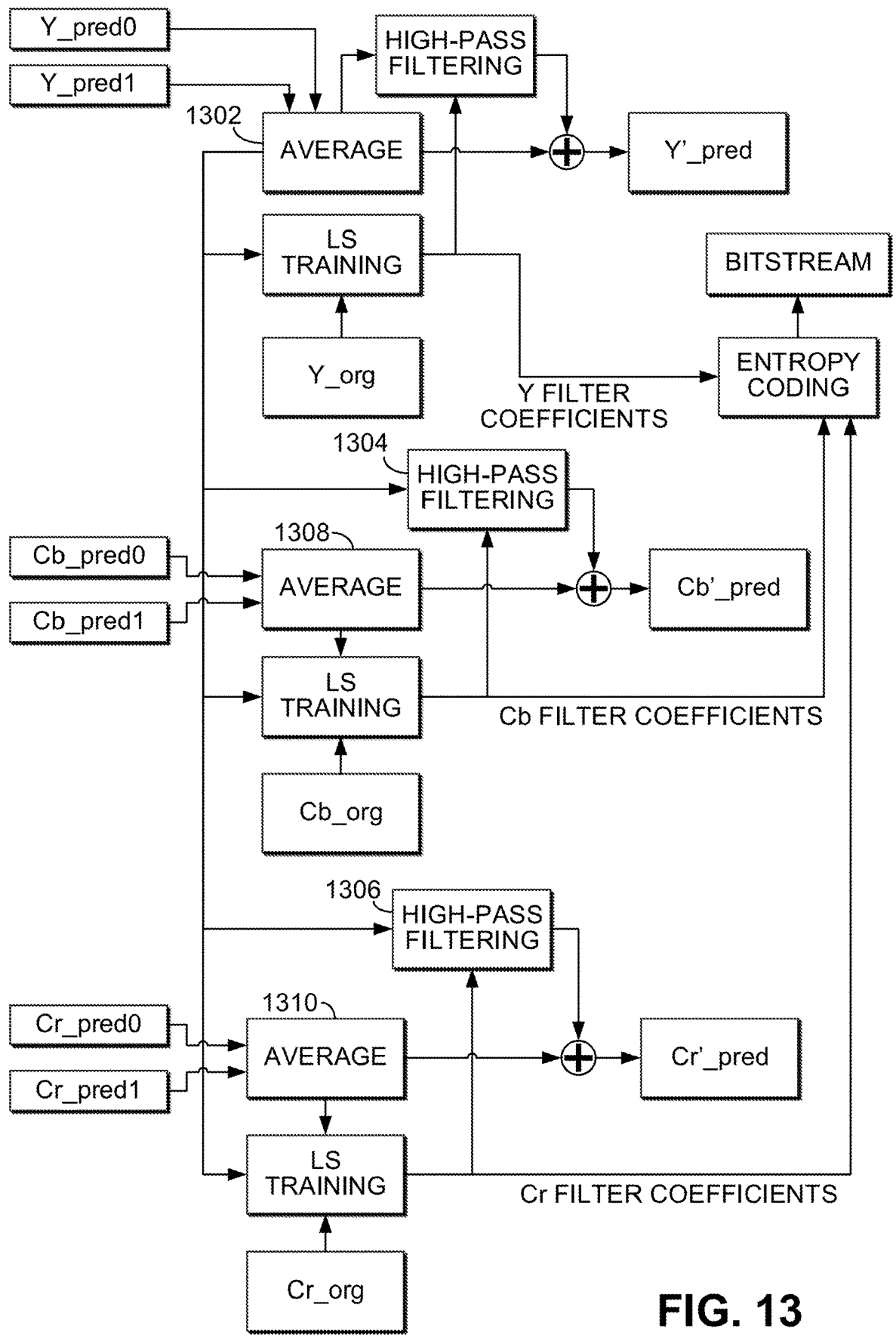
FIG. 13 is a flow diagram of an exemplary motion compensated filtering process for bi-prediction blocks at performed at an encoder, in an embodiment where the motion compensated filters are applied to the average of two prediction signals.
Figure 14:
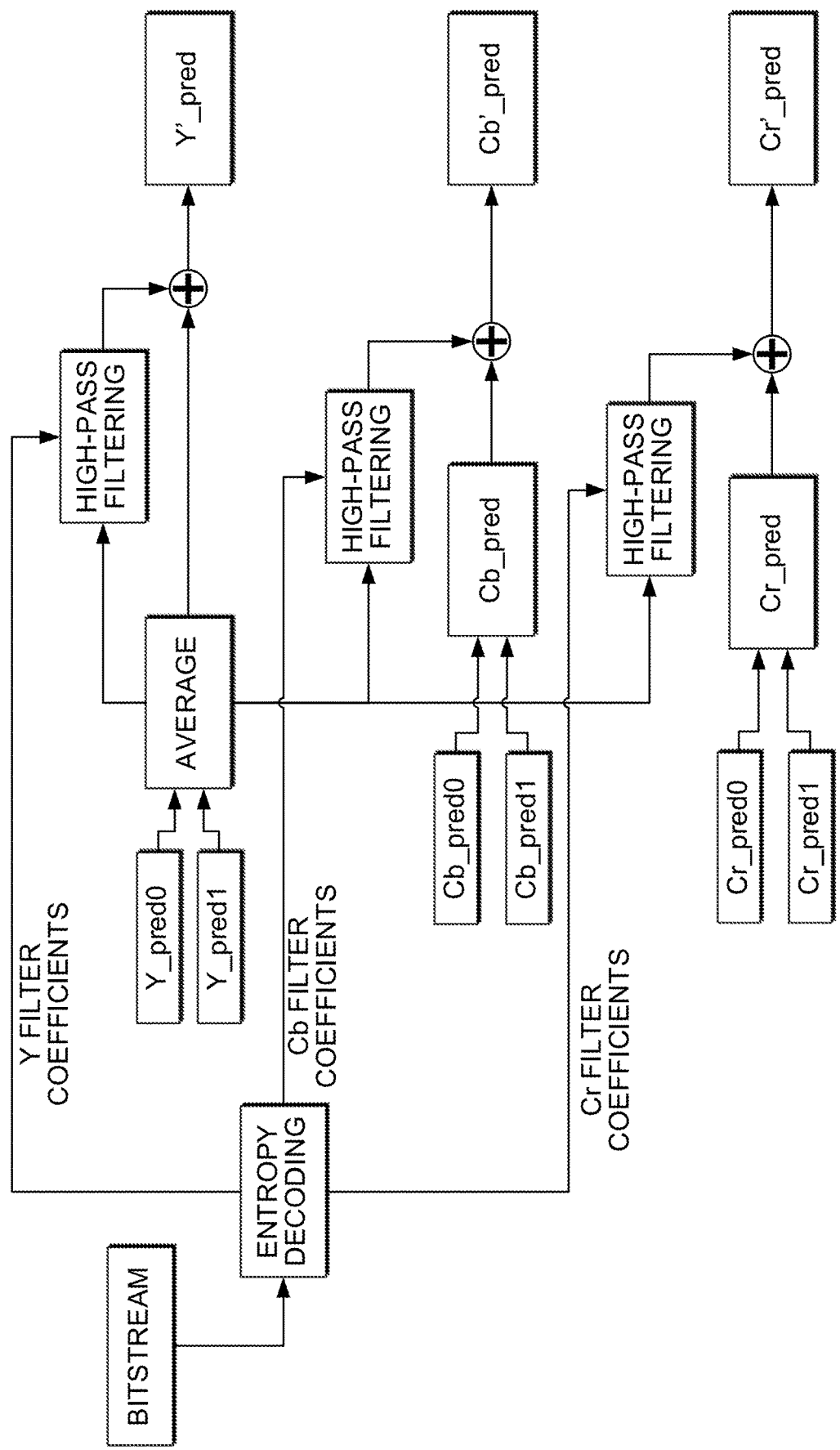
FIG. 14 is a flow diagram of an exemplary motion compensated filtering process for bi-prediction blocks performed at a decoder, in an embodiment in which the motion compensated filters are applied to the average of two prediction signals.

In the exemplary encoder-side method of FIG. 13, two luma prediction signals Y_pred0 and Y_pred1 from two reference pictures are averaged (1302) and used to generate a modified luma prediction signal Y'_pred. The chroma components Cb_pred0 and Cb_pred1 from the two reference pictures are averaged at 1308, and the chroma components Cr_pred0 and Cr_pred1 from the two reference pictures are averaged at 1310. These average chroma components are then enhanced using high-pass filtering of the average luma component generated at 1302. Specifically, the average of Y_pred0 and Y_pred1 is high-pass filtered at 1304 and used to enhance the averaged Cb component (generating Cb'pred), and the average of Y_pred0 and Y_pred1 is high-pass filtered at 1306 and used to enhance the averaged Cr component (generating Cr'pred). A corresponding decoder-side method is illustrated in FIG. 14.

Figure 15:
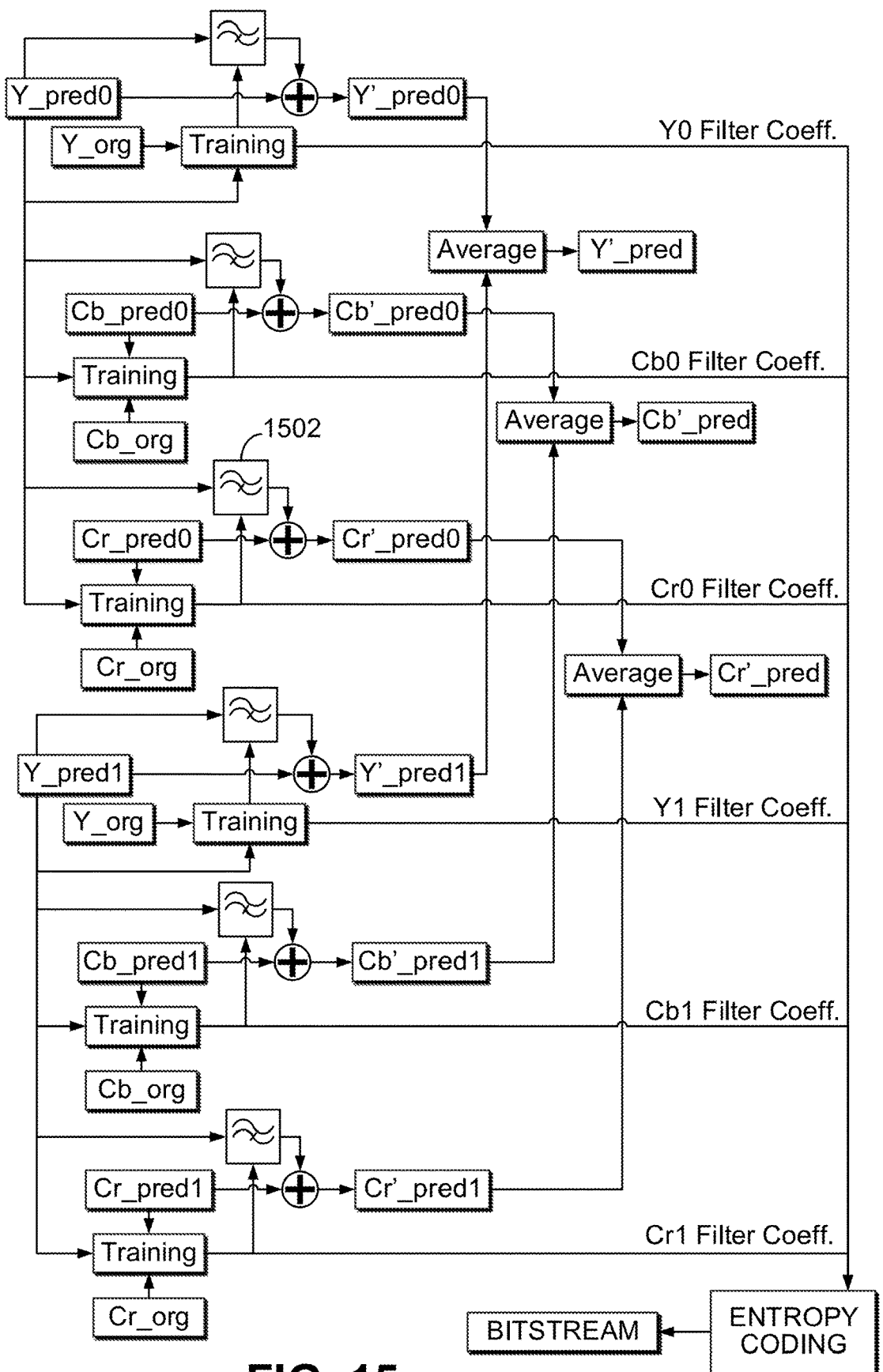
FIG. 15 is a flow diagram of an exemplary motion compensated filtering process for bi-prediction blocks performed at an encoder, in an embodiment where the motion compensated filters are applied to two prediction signals separately.
Figure 16:
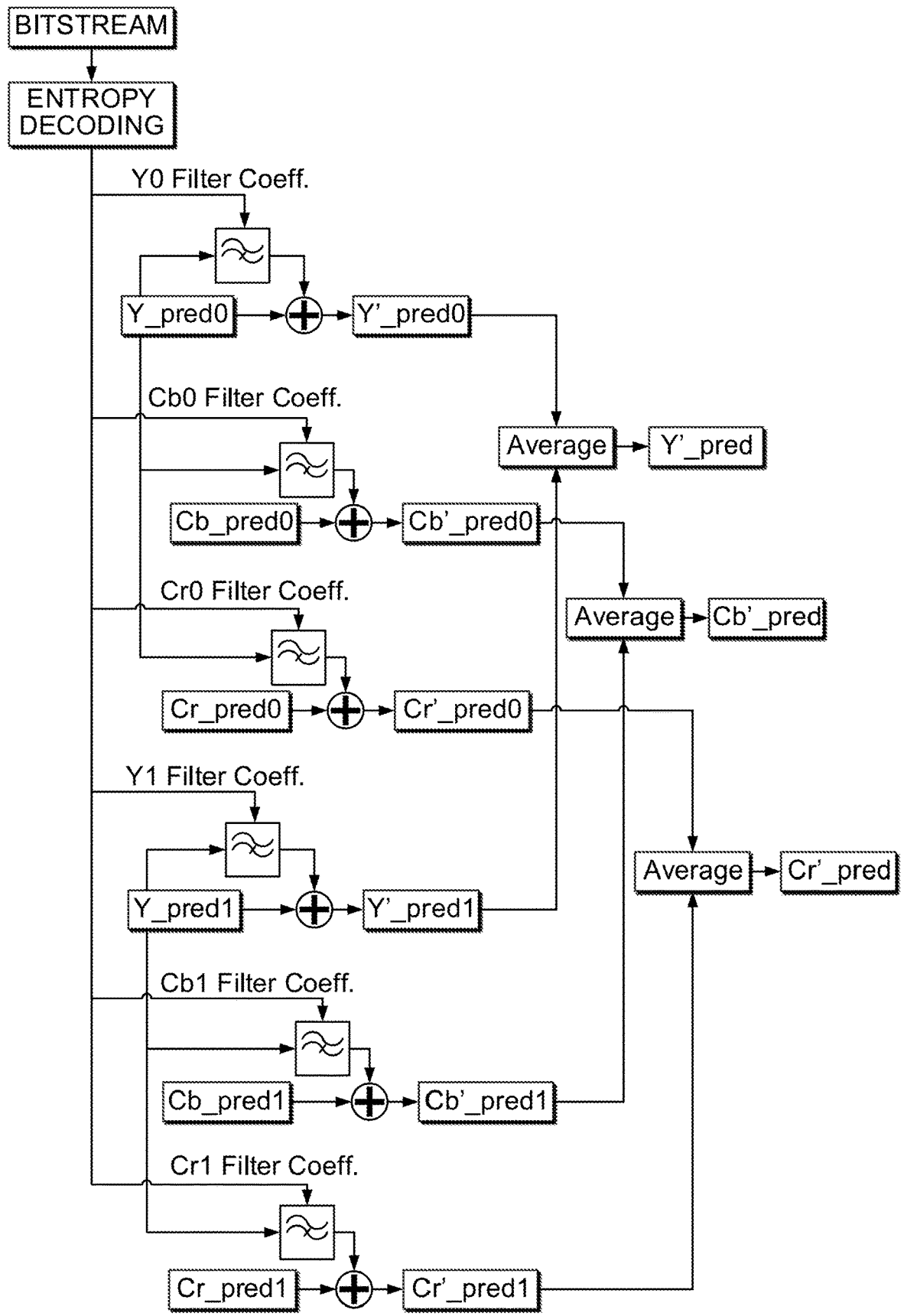
FIG. 16 is a flow diagram of an exemplary motion compensated filtering process for bi-prediction blocks performed at a decoder, in an embodiment where the motion compensated filters are applied to two prediction signals separately.

An alternative method using bi-prediction, is illustrated with respect to FIGS. 15 (encoder side) and 16 (decoder side). In this exemplary method, two different filters (either luma high-pass filters or chroma cross-component filters) are sent and applied (e.g. at high-pass filter 1502) to enhance the motion compensated prediction signals from two reference pictures separately. Specifically, for bi-prediction blocks, this method generates two prediction blocks from two reference picture lists; then, two sets of high-pass filters (one luma high-pass filter and one chroma cross-component filter) will be applied to enhance the quality of two prediction blocks separately before they are averaged for output. Correspondingly, in this method, two LMMSE estimation processes are performed at the encoder which uses the prediction signal from one reference picture (either from list0 or list1) and the original signal as input for filter coefficient optimization. In a case where the original luma prediction signal is used to enhance the chroma prediction signal, FIGS. 15 and 16 illustrate the proposed filtering process for a bi-prediction block when the present method is used in the encoding and decoding processes. FIG. 15 illustrates the workflow when those two filters (one for motion compensated block from list0, and the other for motion compensated block from list1) are estimated separately.

Figure 17:
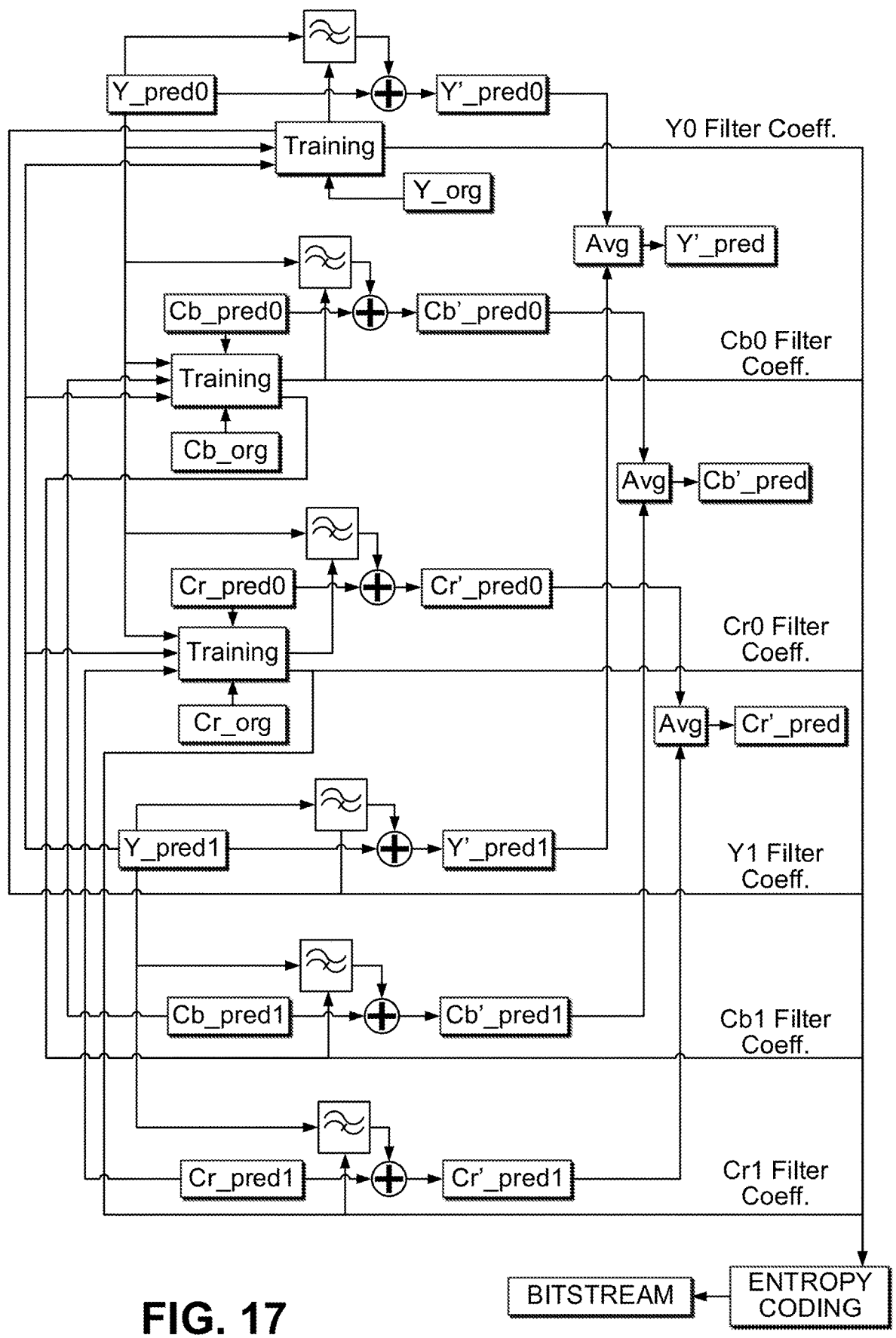
FIG. 17 is a flow diagram of an exemplary motion compensated filtering process for bi-prediction blocks performed at an encoder, in an embodiment where the motion compensated filters are applied to two prediction signals separately and the filters are jointly estimated.

In another embodiment, illustrated in FIG. 17, another joint filter estimation method is employed. In this embodiment, for the Cb component, the Y_pred0, Y_pred1, Cb_pred0, Cb_pred1 and Cb_org are provided as input for joint filter estimation. The joint filter estimation may derive Cb0_filter and Cb1_filter filters by minimizing the following error with LMMSE.

$$\text{error} = Cb\_\text{org} - (Cb\_\text{pred0} + Cb\_\text{pred1} + Cb0\_\text{filter} \times Y\_\text{pred0} + Cb1\_\text{filter} \times Y\_\text{pred1})/2 \quad (13)$$

Figure 18:
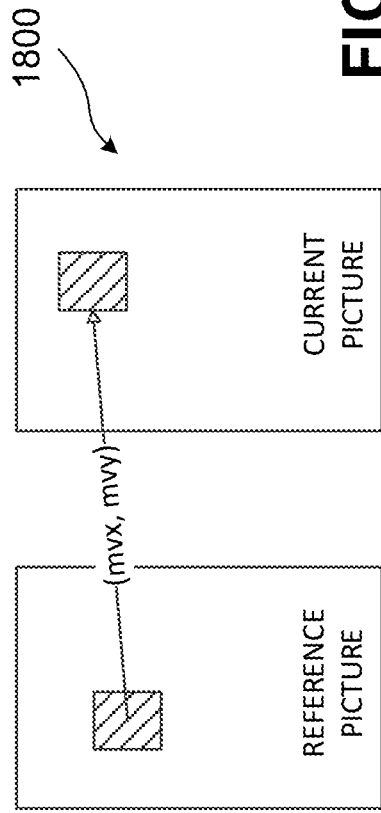
FIG. 18 is a diagram illustrating an example of motion prediction.
Figure 19:
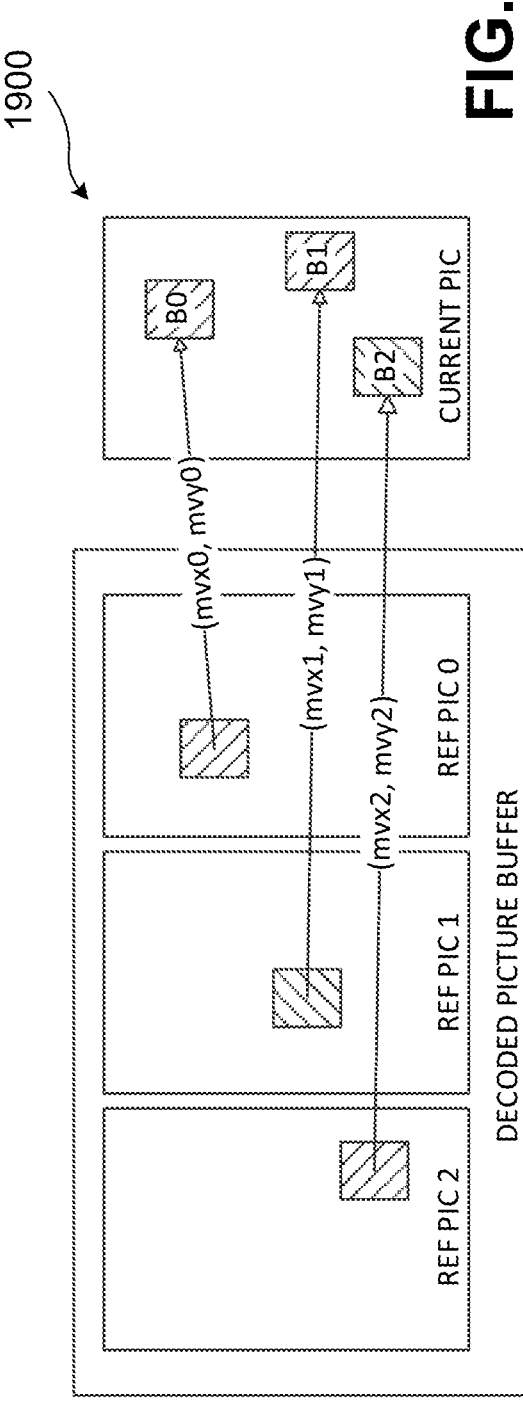
FIG. 19 is a diagram illustrating an example of block-level movement within a picture.

FIG. 18 and FIG. 19 are diagrams illustrating, as shown generally at 1800 and 1900, an example of motion prediction of video blocks (e.g., using temporal prediction unit 162 of FIG. 1). FIG. 19, which illustrates an example of block-level movement within a picture, is a diagram illustrating an example decoded picture buffer including, for example, reference pictures "Ref pic 0," "Ref pic 1," and "Ref pic2." The blocks B0, B1, and B2 in a current picture may be predicted from blocks in reference pictures "Ref pic 0," "Ref pic 1," and "Ref pic2" respectively. Motion prediction may use video blocks from neighboring video frames to predict the current video block. Motion prediction may exploit temporal correlation and/or remove temporal redundancy inherent in the video signal. For example, in H.264/AVC and HEVC, temporal prediction may be performed on video blocks of various sizes (e.g., for the luma component, temporal prediction block sizes may vary from 16×16 to 4×4 in H.264/AVC, and from 64×64 to 4×4 in HEVC). With a motion vector of (mvx, mvy), temporal prediction may be performed as provided by equation (14):

$$P(x,y)=\text{ref}(x-mvx, y-mvy) \quad (14)$$

where ref(x,y) may be pixel value at location (x,y) in the reference picture, and P(x,y) may be the motion compensated block. A video coding system may support inter-prediction with fractional pixel precision. When a motion vector (mvx, mvy) has fractional pixel value, one or more interpolation filters may be applied to obtain the pixel values at fractional pixel positions. Block based video coding systems may use multi-hypothesis prediction to improve temporal prediction, for example, where a prediction signal may be formed by combining a number of prediction signals from different reference pictures. For example, H.264/AVC and/or HEVC may use bi-prediction that may combine two prediction signals. Bi-prediction may combine two prediction signals, each from a reference picture, to form a prediction, such as the following equation (15):

$$P(x, y) = \frac{P_0(x, y) + P_1(x, y)}{2} \quad (15)$$
$$= \frac{\text{ref}_0(x-mvx_0, y-mvy_0) + \text{ref}_1(x-mvx_1, y-mvy_1)}{2}$$

where $P_0(x,y)$ and $P_1(x,y)$ may be the first and the second motion compensated block, respectively. As illustrated in equation (15), the two motion compensated blocks may be obtained by performing motion-compensated prediction from two reference pictures $\text{ref}_0(x,y)$ and ref (x,y), with two motion vectors $(mvx_0, mvy_0)$ and $(mvx_1, mvy_1)$ respectively. The motion compensated block P(x,y) may be subtracted from the source video block (e.g., at 116) to form a prediction residual block. The prediction residual block may be transformed (e.g., at transform unit 104) and/or quantized (e.g., at quantization unit 106). The quantized residual transform coefficient blocks may be sent to an entropy coding unit (e.g., entropy coding unit 108) to be entropy coded to reduce bit rate. The entropy coded residual coefficients may be packed to form part of an output video bitstream (e.g., bitstream 120).

A single layer video encoder may take a single video sequence input and generate a single compressed bit stream transmitted to the single layer decoder. A video codec may be designed for digital video services (e.g., such as but not limited to sending TV signals over satellite, cable and terrestrial transmission channels). With video-centric applications deployed in heterogeneous environments, multi-layer video coding technologies may be developed as an extension of the video coding standards to enable various applications. For example, multiple layer video coding technologies, such as scalable video coding and/or multi-view video coding, may be designed to handle more than one video layer where each layer may be decoded to reconstruct a video signal of a particular spatial resolution, temporal resolution, fidelity, and/or view. Although single layer encoders and decoders are described with reference to FIGS. 1, 2, 5, and 6, the concepts described herein may utilize a multiple layer video encoder and/or decoder, for example, for multi-view and/or scalable coding technologies.

Figure 20:
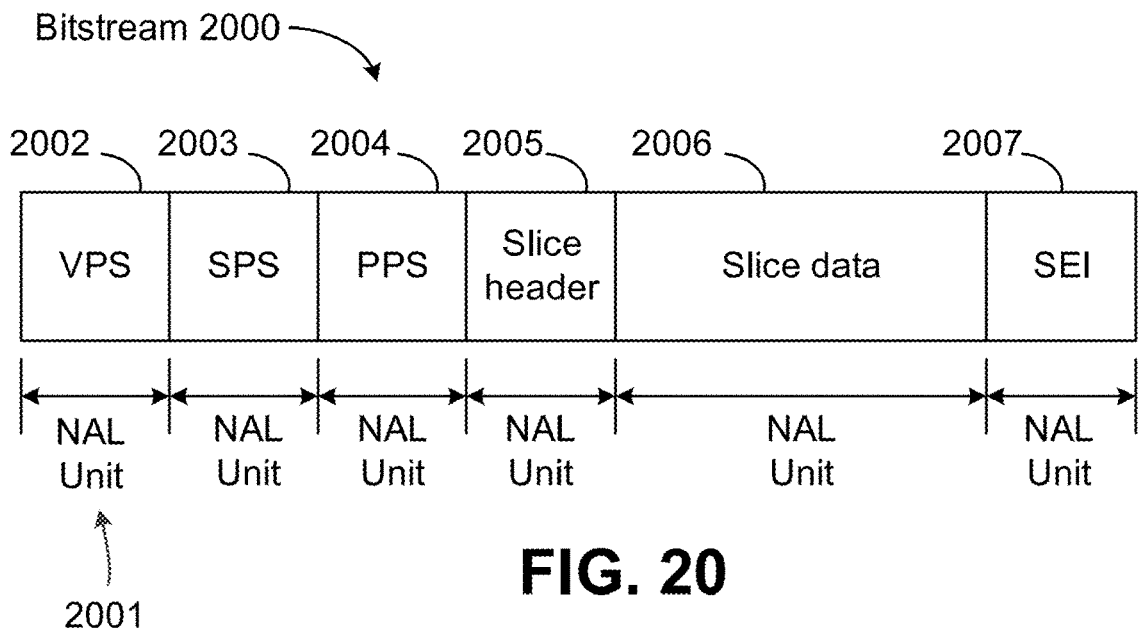
FIG. 20 is a diagram illustrating an example of a coded bitstream structure.

FIG. 20 is a diagram illustrating an example of a coded bitstream structure. A coded bitstream 2000 consists of a number of NAL (Network Abstraction layer) units 2001. A NAL unit may contain coded sample data such as coded slice 2006, or high level syntax metadata such as parameter set data, slice header data 2005 or supplemental enhancement information data 2007 (which may be referred to as an SEI message). Parameter sets are high level syntax structures containing essential syntax elements that may apply to multiple bitstream layers (e.g. video parameter set 2002 (VPS)), or may apply to a coded video sequence within one layer (e.g. sequence parameter set 2003 (SPS)), or may apply to a number of coded pictures within one coded video sequence (e.g. picture parameter set 2004 (PPS)). The parameter sets can be either sent together with the coded pictures of the video bit stream, or sent through other means (including out-of-band transmission using reliable channels, hard coding, etc.). Slice header 2005 is also a high level syntax structure that may contain some picture-related information that is relatively small or relevant only for certain slice or picture types. SEI messages 2007 carry the information that may not be needed by the decoding process but can be used for various other purposes such as picture output timing or display as well as loss detection and concealment.

Figure 21:
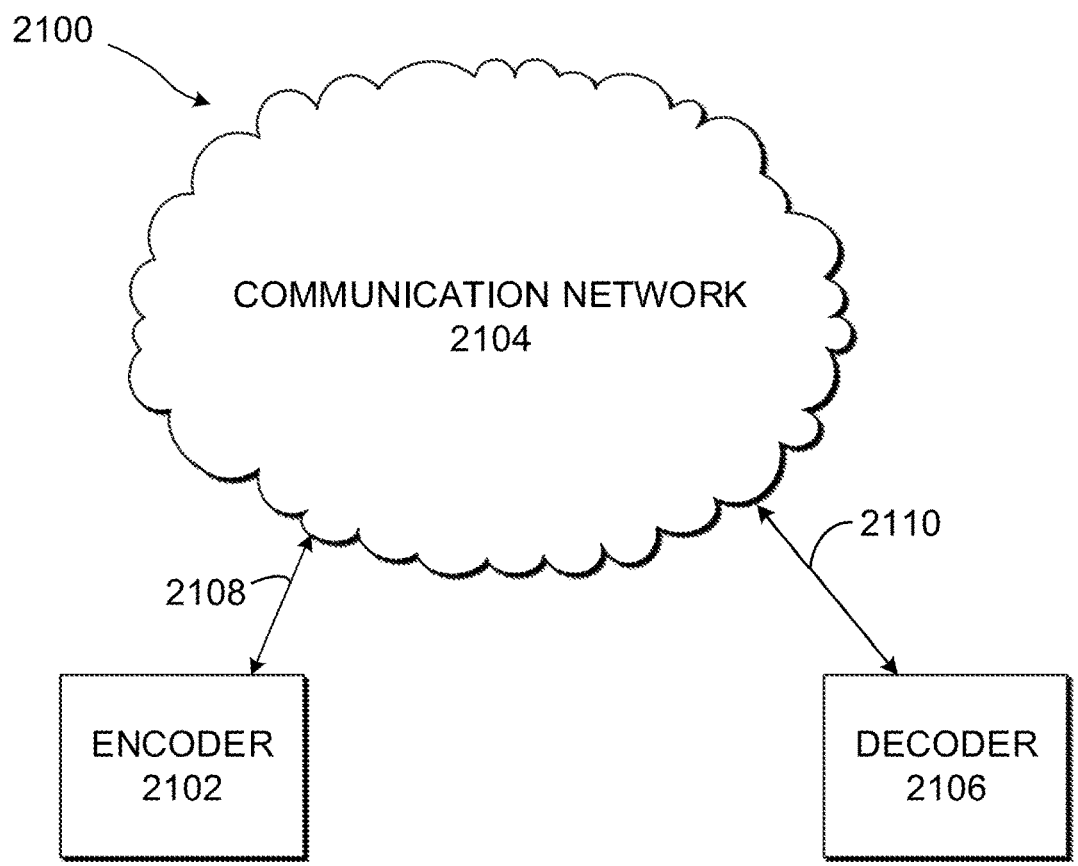
FIG. 21 is a diagram illustrating an example communication system.

FIG. 21 is a diagram illustrating an example of a communication system. The communication system 2100 may comprise an encoder 2102, a communication network 2104, and a decoder 2106. The encoder 2102 may be in communication with the network 2104 via a connection 2108, which may be a wireline connection or a wireless connection. The encoder 2102 may be similar to the block-based video encoder of FIG. 5. The encoder 2102 may include a single layer codec (e.g., FIG. 5) or a multilayer codec. The decoder 2106 may be in communication with the network 2104 via a connection 2110, which may be a wireline connection or a wireless connection. The decoder 2106 may be similar to the block-based video decoder of FIG. 6. The decoder 2106 may include a single layer codec (e.g., FIG. 6) or a multilayer codec.

The encoder 2102 and/or the decoder 2106 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 2104 may be a suitable type of communication network. For example, the communications network 2104 may be a multiple access system that provides content, such as voice, data, video, messaging, broadcast, etc., to multiple wireless users. The communications network 2104 may enable multiple wireless users to access such content through the sharing of system resources, including wireless bandwidth. For example, the communications network 2104 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 2104 may include multiple connected communication networks. The communication network 2104 may include the Internet and/or one or more private commercial networks such as cellular networks, WiFi hotspots, Internet Service Provider (ISP) networks, and/or the like.

Figure 22:
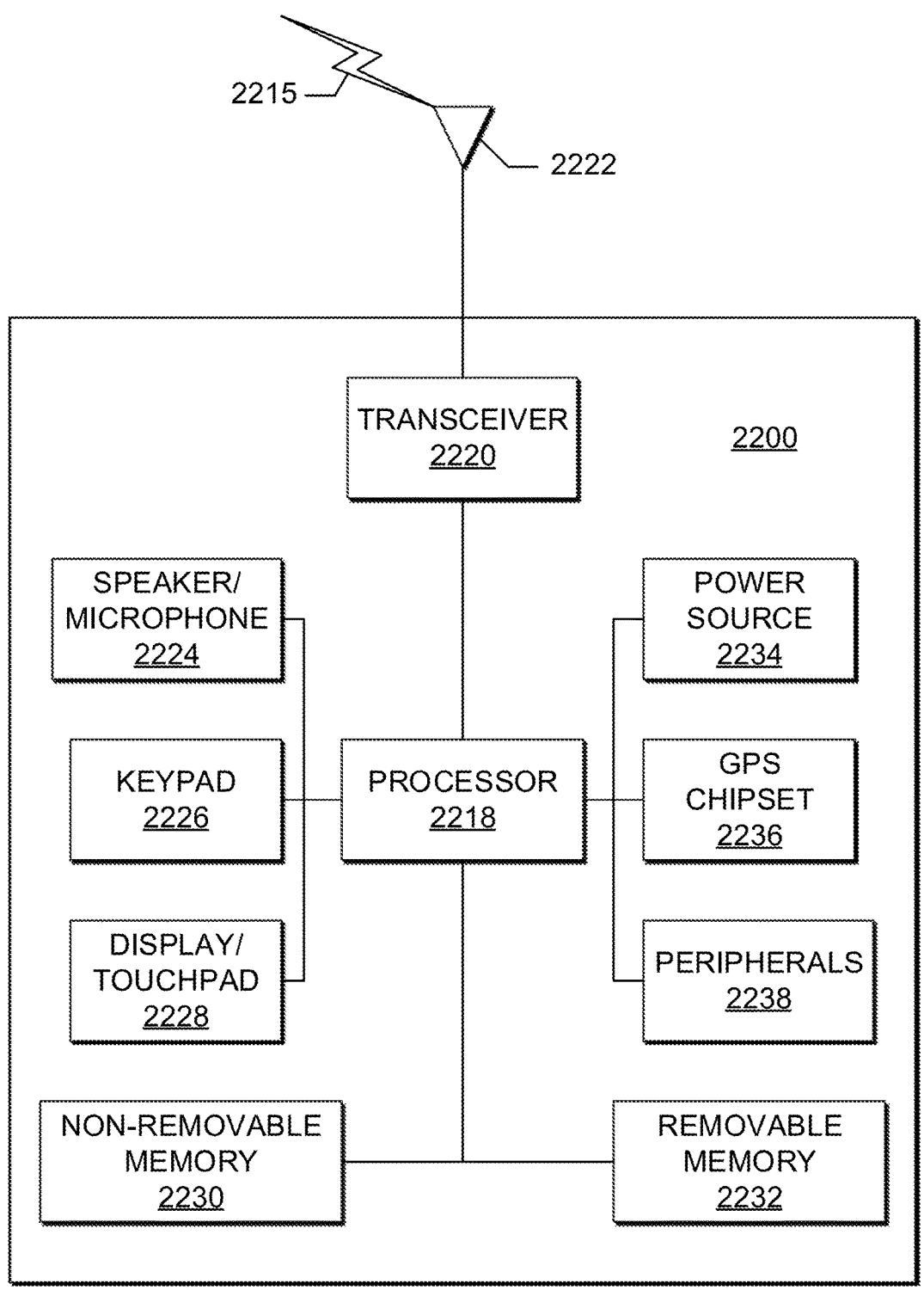
FIG. 22 is a diagram illustrating an example wireless transmit/receive unit (WTRU) which may be used as an encoder or decoder in exemplary embodiments.

FIG. 22 is a system diagram of an example WTRU. As shown the example WTRU 2200 may include a processor 2218, a transceiver 2220, a transmit/receive element 2222, a speaker/microphone 2224, a keypad or keyboard 2226, a display/touchpad 2228, non-removable memory 2230, removable memory 2232, a power source 2234, a global positioning system (GPS) chipset 2236, and/or other peripherals 2238. It will be appreciated that the WTRU 2200 may include any sub-combination of the foregoing elements while remaining consistent with an embodiment. Further, a terminal in which an encoder (e.g., encoder 100) and/or a decoder (e.g., decoder 200) is incorporated may include some or all of the elements depicted in and described herein with reference to the WTRU 2200 of FIG. 22.

The processor 2218 may be a general-purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 2218 may perform signal coding, data processing, power control, input/output processing, and/or any other functionality that enables the WTRU 2200 to operate in a wired and/or wireless environment. The processor 2218 may be coupled to the transceiver 2220, which may be coupled to the transmit/receive element 2222. While FIG. 22 depicts the processor 2218 and the transceiver 2220 as separate components, it will be appreciated that the processor 2218 and the transceiver 2220 may be integrated together in an electronic package and/or chip.

The transmit/receive element 2222 may be configured to transmit signals to, and/or receive signals from, another terminal over an air interface 2215. For example, in one or more embodiments, the transmit/receive element 2222 may be an antenna configured to transmit and/or receive RF signals. In one or more embodiments, the transmit/receive element 2222 may be an emitter/detector configured to transmit and/or receive IR, UV, or visible light signals, for example. In one or more embodiments, the transmit/receive element 2222 may be configured to transmit and/or receive both RF and light signals. It will be appreciated that the transmit/receive element 2222 may be configured to transmit and/or receive any combination of wireless signals.

In addition, although the transmit/receive element 2222 is depicted in FIG. 22 as a single element, the WTRU 2200 may include any number of transmit/receive elements 2222. More specifically, the WTRU 2200 may employ MIMO technology. Thus, in one embodiment, the WTRU 2200 may include two or more transmit/receive elements 2222 (e.g., multiple antennas) for transmitting and receiving wireless signals over the air interface 2215.

The transceiver 2220 may be configured to modulate the signals that are to be transmitted by the transmit/receive element 2222 and/or to demodulate the signals that are received by the transmit/receive element 2222. As noted above, the WTRU 2200 may have multi-mode capabilities. Thus, the transceiver 2220 may include multiple transceivers for enabling the WTRU 2200 to communicate via multiple RATs, such as UTRA and IEEE 802.11, for example.

The processor 2218 of the WTRU 2200 may be coupled to, and may receive user input data from, the speaker/microphone 2224, the keypad 2226, and/or the display/touchpad 2228 (e.g., a liquid crystal display (LCD) display unit or organic light-emitting diode (OLED) display unit). The processor 2218 may also output user data to the speaker/microphone 2224, the keypad 2226, and/or the display/touchpad 2228. In addition, the processor 2218 may access information from, and store data in, any type of suitable memory, such as the non-removable memory 2230 and/or the removable memory 2232. The non-removable memory 2230 may include random-access memory (RAM), read-only memory (ROM), a hard disk, or any other type of memory storage device. The removable memory 2232 may include a subscriber identity module (SIM) card, a memory stick, a secure digital (SD) memory card, and the like. In one or more embodiments, the processor 2218 may access information from, and store data in, memory that is not physically located on the WTRU 2200, such as on a server or a home computer (not shown).

The processor 2218 may receive power from the power source 2234, and may be configured to distribute and/or control the power to the other components in the WTRU 2200. The power source 2234 may be any suitable device for powering the WTRU 2200. For example, the power source 2234 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 2218 may be coupled to the GPS chipset 2236, which may be configured to provide location information (e.g., longitude and latitude) regarding the current location of the WTRU 2200. In addition to, or in lieu of, the information from the GPS chipset 2236, the WTRU 2200 may receive location information over the air interface 2215 from a terminal (e.g., a base station) and/or determine its location based on the timing of the signals being received from two or more nearby base stations. It will be appreciated that the WTRU 2200 may acquire location information by way of any suitable location-determination method while remaining consistent with an embodiment.

The processor 2218 may further be coupled to other peripherals 2238, which may include one or more software and/or hardware modules that provide additional features, functionality and/or wired or wireless connectivity. For example, the peripherals 2238 may include an accelerometer, orientation sensors, motion sensors, a proximity sensor, an e-compass, a satellite transceiver, a digital camera and/or video recorder (e.g., for photographs and/or video), a universal serial bus (USB) port, a vibration device, a television transceiver, a hands free headset, a Bluetooth® module, a frequency modulated (FM) radio unit, and software modules such as a digital music player, a media player, a video game player module, an Internet browser, and the like.

By way of example, the WTRU 2200 may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a tablet computer, a personal computer, a wireless sensor, consumer electronics, or any other terminal capable of receiving and processing compressed video communications.

The WTRU 2200 and/or a communication network (e.g., communication network 2104) may implement a radio technology such as Universal Mobile Telecommunications System (UMTS) Terrestrial Radio Access (UTRA), which may establish the air interface 2215 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA). The WTRU 2200 and/or a communication network (e.g., communication network 2104) may implement a radio technology such as Evolved UMTS Terrestrial Radio Access (E-UTRA), which may establish the air interface 2215 using Long Term Evolution (LTE) and/or LTE-Advanced (LTE-A).

The WTRU 2200 and/or a communication network (e.g., communication network 2104) may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like. The WTRU 2200 and/or a communication network (e.g., communication network 2104) may implement a radio technology such as IEEE 802.11, IEEE 802.15, or the like.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

REFERENCES

[1] ITU-T Rec H.264 and ISO/IEC/MPEG 4 part 10, Advanced video coding for generic audiovisual services, November 2007
[2] SMPTE 421M, "VC-1 Compressed Video Bitstream Format and Decoding Process," April 2006.
[3] JM reference software JM16.1, http://iphome.hhi.de/suehring/tml/download/jm16.1.zip, September, 2009.
[4] B. Bross, W.-J. Han, G. J. Sullivan, J.-R. Ohm, T. Wiegand. High Efficiency Video Coding (HEVC) text specification draft 10, JCTVC-L1003, February 2012.
[5] T. Wiegand, W.-J. Han, B. Bross, J.-R. Ohm, G. Sullivan, WD3: Working draft 3 of High Efficiency Video Coding, JCTVC-E603, March 2011.
[6] J. Dong, Y. He, Y. Ye, U.S. Patent Application No. 2014/0092999A1, "Cross-plane filtering for chroma signal enhancement in video coding".

The invention claimed is:
1. A video decoding method comprising:
   generating a motion-compensated signal comprising at least a motion-compensated luma component and at least a first motion-compensated chroma component;
   applying a first high-pass filter to the motion-compensated luma component to generate a first filtered output;
   prior to applying the first high-pass filter to the motion-compensated luma component, modifying the motion-compensated luma component by a method comprising:
      applying a second high-pass filter to the motion-compensated luma component to generate a second filtered output; and
      modifying the luma component by adding the second filtered output to the motion-compensated luma component, where the first high-pass filter is applied to modified luma component to generate the first filtered output;
   modifying the motion-compensated signal by adding the first filtered output to the first motion-compensated chroma component;
   decoding a prediction residual from a bitstream; and
   after applying the first high-pass filter, reconstructing the video signal by adding the prediction residual to the modified motion-compensated signal.

2. The method of claim 1, wherein generating the motion-compensated signal comprises generating the motion-compensated signal through bi-prediction by averaging a first motion-compensated signal from a first reference picture and a second reference picture from a second reference picture.

3. The method of claim 1, wherein the motion-compensated signal further comprises a second motion-compensated chroma component, the method further comprising:
   applying a third high-pass filter to the motion-compensated luma component to generate a third filtered output; and
   further modifying the motion-compensated signal by adding the third filtered output to the second motion-compensated chroma component, wherein the further-modified motion-compensated signal is used for reconstructing the video signal.

4. The method of claim 1, wherein the first high-pass filter is defined by a set of filter coefficients, further comprising decoding the filter coefficients from the bitstream.

5. The method of claim 1, wherein the first high-pass filter is defined by a plurality of coefficients subject to a symmetry constraint.

6. The method of claim 1, wherein the first high-pass filter is defined by a plurality of coefficients subject to a zero summation constraint.

7. The method of claim 1, further comprising extracting filter coefficients from the bitstream, wherein the first high-pass filter is a filter defined by the extracted filter coefficients.

8. The method of claim 1, further comprising deriving filter coefficients for a current block based on previously-reconstructed samples in a neighboring region, wherein the first high-pass filter is a filter defined by the derived filter coefficients.

9. A video decoder comprising a processor configured to perform at least:
   generating a motion-compensated signal comprising at least a motion-compensated luma component and at least a first motion-compensated chroma component;
   applying a first high-pass filter to the motion-compensated luma component to generate a first filtered output;
   prior to applying the first high-pass filter to the motion-compensated luma component, modifying the motion-compensated luma component by a method comprising:

applying a second high-pass filter to the motion-compensated luma component to generate a second filtered output; and modifying the luma component by adding the second filtered output to the motion-compensated luma component, where the first high-pass filter is applied to modified luma component to generate the first filtered output; and modifying the motion-compensated signal by adding the first filtered output to the first motion-compensated chroma component; and after applying the first high-pass filter, reconstructing the video signal by adding, to the modified motion-compensated signal, a prediction residual decoded from a bitstream.

10. The decoder of claim 9, wherein the first high-pass filter is defined by a set of filter coefficients, and wherein the processor is further configured to decode the filter coefficients from the bitstream.

11. The decoder of claim 9, wherein generating the motion-compensated signal comprises generating the motion-compensated signal through bi-prediction by averaging a first motion-compensated signal from a first reference picture and a second reference picture from a second reference picture.

12. A video encoding method comprising:
generating a motion-compensated signal comprising at least a motion-compensated luma component and at least a first motion-compensated chroma component;
applying a first high-pass filter to the motion-compensated luma component to generate a first filtered output;

prior to applying the first high-pass filter to the motion-compensated luma component, modifying the motion-compensated luma component by a method comprising:
applying a second high-pass filter to the motion-compensated luma component to generate a second filtered output; and modifying the luma component by adding the second filtered output to the motion-compensated luma component, where the first high-pass filter is applied to modified luma component to generate the first filtered output; and modifying the motion-compensated signal by adding the first filtered output to the first motion-compensated chroma component;

after applying the first high-pass filter, determining a prediction residual representing a difference between the modified motion-compensated signal and an input video signal; and encoding the prediction residual in a bitstream.

13. The method of claim 12, wherein the first high-pass filter is defined by a set of filter coefficients, further comprising encoding the filter coefficients in the bitstream.

14. The method of claim 12, wherein generating the motion-compensated signal comprises generating the motion-compensated signal through bi-prediction by averaging a first motion-compensated signal from a first reference picture and a second reference picture from a second reference picture.

* * * * *